(12) United States Patent
Teraya

(10) Patent No.: US 9,718,372 B2
(45) Date of Patent: Aug. 1, 2017

(54) CONTROL APPARATUS FOR VEHICLE AND VEHICLE

(71) Applicant: Ryuta Teraya, Gotenba (JP)

(72) Inventor: Ryuta Teraya, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/440,929

(22) PCT Filed: Oct. 2, 2013

(86) PCT No.: PCT/JP2013/076798
§ 371 (c)(1),
(2) Date: May 6, 2015

(87) PCT Pub. No.: WO2014/073294
PCT Pub. Date: May 15, 2014

(65) Prior Publication Data
US 2015/0298688 A1 Oct. 22, 2015

(30) Foreign Application Priority Data

Nov. 9, 2012 (JP) ................................. 2012-247621

(51) Int. Cl.
B60L 11/18 (2006.01)
B60L 1/00 (2006.01)
(Continued)

(52) U.S. Cl.
CPC ........... *B60L 11/1842* (2013.01); *B60L 1/006* (2013.01); *B60L 11/1818* (2013.01); *B60L 11/1838* (2013.01); *B60L 11/1844* (2013.01); *B60L 11/1846* (2013.01); *B60L 11/1887* (2013.01); *B60W 10/26* (2013.01); *B60K 6/445* (2013.01); *B60L 8/003* (2013.01); *B60L 11/123* (2013.01); *B60L 11/14* (2013.01); *B60L 2210/14* (2013.01); *B60L 2210/40* (2013.01); *B60L 2240/36* (2013.01); *B60L 2240/441* (2013.01); *B60L 2240/443* (2013.01); *B60L 2240/445* (2013.01); *B60L 2240/461* (2013.01);
(Continued)

(58) Field of Classification Search
CPC .............. B60L 11/1842; B60L 11/1838; B60L 11/1844; B60L 11/1818; B60L 1/006
See application file for complete search history.

(56) References Cited

U.S. PATENT DOCUMENTS

2007/0289794 A1* 12/2007 Ishikawa ............. B60L 11/1842
180/165
2008/0185197 A1* 8/2008 Nakamura ............... B60L 1/006
180/65.28
(Continued)

FOREIGN PATENT DOCUMENTS

CN 101635529 A 1/2010
CN 102092387 A 6/2011
(Continued)

*Primary Examiner* — Dale W Hilgendorf
(74) *Attorney, Agent, or Firm* — Finnegan, Henderson, Farabow, Garrett & Dunner, LLP

(57) ABSTRACT

An ECU sets a voltage of an inverter side in an external supply mode to be less than a voltage of the inverter side when a first MG supplies the electric power equal to the electric power in the external supply mode in a traveling generation mode.

10 Claims, 13 Drawing Sheets

(51) Int. Cl.
*B60W 10/26* (2006.01)
*B60K 6/445* (2007.10)
*B60L 11/14* (2006.01)
*B60L 8/00* (2006.01)
*B60L 11/12* (2006.01)
*B60W 10/00* (2006.01)
*B60W 10/08* (2006.01)
*B60W 20/00* (2016.01)
*B60W 20/19* (2016.01)

(52) U.S. Cl.
CPC ....... *B60L 2270/32* (2013.01); *B60L 2270/34* (2013.01); *B60W 10/00* (2013.01); *B60W 10/08* (2013.01); *B60W 20/00* (2013.01); *B60W 20/19* (2016.01); *B60Y 2400/214* (2013.01); *Y02E 60/721* (2013.01); *Y02T 10/6217* (2013.01); *Y02T 10/6239* (2013.01); *Y02T 10/7072* (2013.01); *Y02T 10/7077* (2013.01); *Y02T 10/7083* (2013.01); *Y02T 10/7225* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 10/126* (2013.01); *Y04S 30/14* (2013.01); *Y10S 903/93* (2013.01)

(56) References Cited

U.S. PATENT DOCUMENTS

| | | |
|---|---|---|
| 2009/0021200 A1 | 1/2009 | Yaguchi |
| 2009/0058097 A1* | 3/2009 | Oyobe ............... B60L 11/1842 290/1 R |
| 2010/0013438 A1* | 1/2010 | Anwar ............... B60L 11/1842 180/65.29 |
| 2010/0133900 A1* | 6/2010 | King ..................... B60L 1/006 180/65.21 |
| 2011/0121779 A1 | 5/2011 | Ichikawa et al. |
| 2011/0139096 A1* | 6/2011 | Niimi .................... B60K 6/445 123/2 |
| 2012/0049771 A1 | 3/2012 | Komatsu |
| 2014/0311426 A1 | 10/2014 | Yamazaki |

FOREIGN PATENT DOCUMENTS

| | | |
|---|---|---|
| JP | 11-4506 | 1/1999 |
| JP | 11-150805 | 6/1999 |
| JP | 2000-234539 | 8/2000 |
| JP | 2006-121844 | 5/2006 |
| JP | 2007-290478 | 11/2007 |
| JP | 2009-248644 | 10/2009 |
| JP | 2010-35277 | 2/2010 |
| JP | 2013-91377 | 5/2013 |
| WO | WO 2010/131352 A1 | 11/2010 |
| WO | WO 2013/080273 A1 | 6/2013 |

* cited by examiner

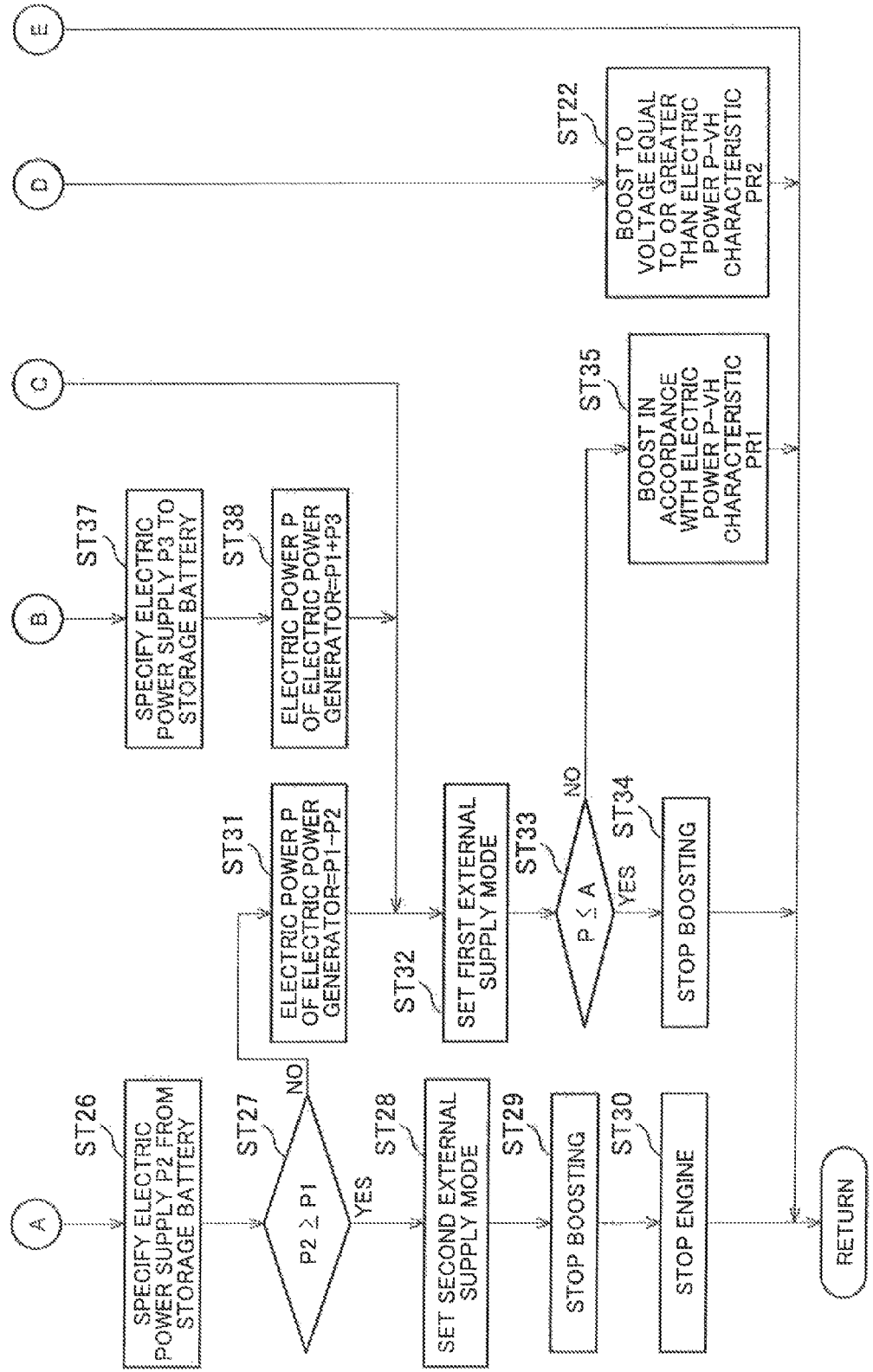

CONTROL APPARATUS FOR VEHICLE AND VEHICLE

CROSS-REFERENCE TO RELATED APPLICATIONS

This application is a national phase application of International Application No. PCT/JP2013/076798, filed Oct. 2, 2013, and claims the priority of Japanese Application No. 2012-247621, filed Nov. 9, 2012, the content of both of which is incorporated herein by reference.

TECHNICAL FIELD

The invention relates to a control apparatus for a vehicle and a vehicle provided with the same. More specifically, the invention relates to controlling a hybrid vehicle that has an external terminal for external electric power supply.

BACKGROUND ART

International Publication No. 2010-131352 discloses a technique for stopping the driving of a booster circuit that boosts the voltage of a battery for supply to an electric power generator because electric power exchange between the electric power generator and the battery is unnecessary during parking.

Japanese Patent Application Publication Nos. 2000-234539 and 2007-290478 are examples of the related art.

SUMMARY OF THE INVENTION

According to the related art, time loss is present between a non-boosted state and the execution of boosting even in a case where an operation can be performed without boosting during traveling. Accordingly, the boosting is executed so as to ensure torque response.

In the case of electric power supply to a power recipient outside of a vehicle during parking, however, executing boost control so as to ensure torque response as in traveling could lead to electrical loss attributable to boosting of the voltage. This could lead to deterioration in fuel economy.

An object of the invention is to provide a technique for reducing electrical loss attributable to boosting when electric power is supplied to the power recipient outside of a vehicle.

A vehicle according to a first aspect of the invention includes an electric power generator, an electric power storage device, an internal combustion engine for traveling the vehicle and driving the electric power generator, an electric circuit configured to be capable of outputting electric power generated by the electric power generator or electric power output from the electric power storage device to a power recipient outside of the vehicle, a drive circuit driving the electric power generator, a voltage conversion device disposed between the electric power storage device and the electric power generator, and a control unit. The control unit sets the vehicle into a first mode in which electric power is generated in the electric power generator by the internal combustion engine during parking of the vehicle and the generated electric power is supplied to the power recipient outside of the vehicle or a second mode in which electric power is generated in the electric power generator by the internal combustion engine during traveling of the vehicle. The control unit limits an operation of the voltage conversion device in the first mode.

Preferably, the control unit allows a voltage set on the drive circuit side in the first mode to be less than a voltage set on the drive circuit side when the electric power generator supplies the electric power equal to the electric power in the first mode in the second mode.

Preferably, the control unit stops a boosting operation by the voltage conversion device in the first mode.

Preferably, the control unit executes a boosting operation by the voltage conversion device in the second mode regardless of the electric power required to be generated by the electric power generator. The control unit stops the boosting operation by the voltage conversion device, in a case where the electric power required to be generated by the electric power generator is equal to or less than a predetermined value in the first mode.

Preferably, the electric power required to be generated by the electric power generator is electric power obtained by subtracting a second electric power from a first electric power in a case where the supply of the first electric power is requested from the power recipient outside of the vehicle and the second electric power is supplied from the electric power storage device to the outside power recipient in the first mode.

Preferably, the electric power required to be generated by the electric power generator is electric power obtained by adding a first electric power to a second electric power in a case where the supply of the first electric power is requested from the power recipient outside of the vehicle and the second electric power is supplied from the electric power generator to the electric power storage device in the first mode.

Preferably, the electric power required to be generated by the electric power generator is a first electric power in a case where the supply of the first electric power is requested from the power recipient outside of the vehicle, no electric power is supplied from the electric power storage device to the power recipient outside of the vehicle, and no electric power is supplied from the electric power generator to the electric power storage device in the first mode.

Preferably, the control unit executes the boosting operation by the voltage conversion device in a case where the electric power required to be generated by the electric power generator exceeds the predetermined value in the first mode. The control unit sets the voltage of the drive circuit side to be less than the voltage set on the drive circuit side by the boosting operation of the voltage conversion device when the electric power generator supplies the electric power equal to the electric power in the first mode in the second mode, in a case where the voltage set on the drive circuit side by the boosting operation in the first mode is lower than an upper limit value of boosting by the voltage conversion device.

Preferably, the predetermined value is electric power that the electric power generator can generate without boosting.

A vehicle according to a second aspect of the invention includes an electric power generator, an electric power storage device, an internal combustion engine for traveling the vehicle and driving the electric power generator, an electric circuit configured to be capable of outputting electric power generated by the electric power generator or electric power output from the electric power storage device to the power recipient outside of the vehicle, a voltage conversion device disposed between the electric power storage device and the electric power generator, and a control unit. The control unit stops a boosting operation by the voltage conversion device, in a case where the supply of a first electric power is requested from the power recipient outside of the vehicle and the first electric power is supplied from the electric power storage device to the power recipient outside of the vehicle in an external supply mode in which electric power is supplied to the power recipient outside of the vehicle during parking of the vehicle.

Preferably, the control unit stops both the boosting operation and the internal combustion engine.

A control apparatus for a vehicle according to a third aspect of the invention is a control apparatus for a vehicle including an electric power generator, an electric power storage device, an internal combustion engine for traveling the vehicle and driving the electric power generator, an electric circuit configured to be capable of outputting electric power generated by the electric power generator or electric power output from the electric power storage device to the power recipient outside of the vehicle, and a voltage conversion device disposed between the electric power storage device and the electric power generator. The control apparatus includes a mode setting unit and an electric power control unit. The mode setting unit sets the vehicle into a first mode in which electric power is generated in the electric power generator by the internal combustion engine during parking of the vehicle and the generated electric power is supplied to the power recipient outside of the vehicle, or a second mode in which electric power is generated in the electric power generator by the internal combustion engine during traveling of the vehicle. The electric power control unit limits an operation of the voltage conversion device in the first mode.

According to the invention, electrical loss attributable to boosting can be reduced when electric power is supplied to the power recipient outside of the vehicle.

MODES FOR CARRYING OUT THE INVENTION

Figure 1:
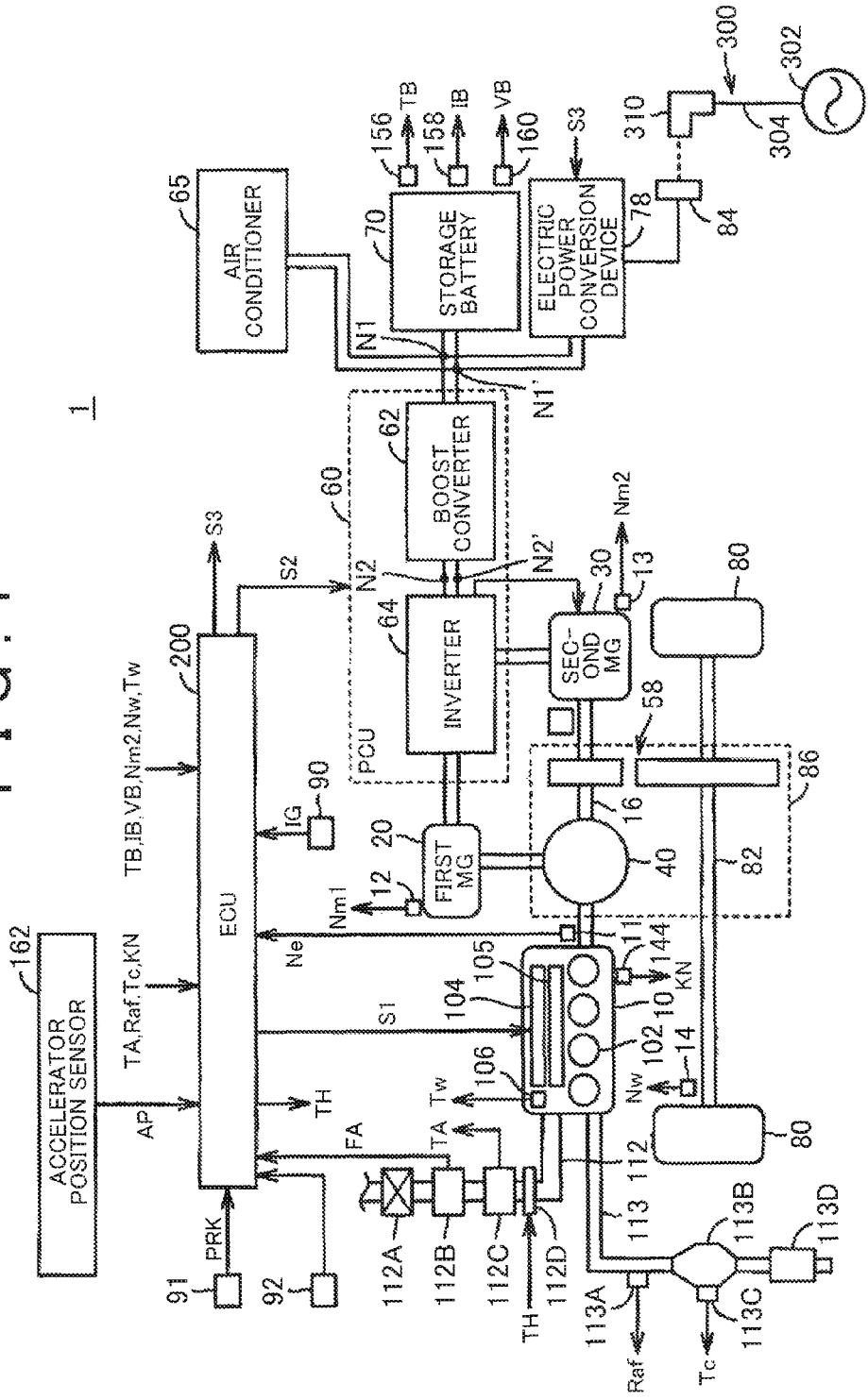
FIG. 1 is an overall block diagram of a vehicle 1 according to a first embodiment of the invention.

Hereinafter, embodiments of the invention will be described with reference to the accompanying drawings.

Hereinafter, embodiments of the invention will be described in detail with reference to the accompanying drawings. In the drawings, like reference numerals will be used to refer to like or corresponding elements and description thereof will not be repeated.

First Embodiment

FIG. 1 is an overall block diagram of a vehicle 1 according to a first embodiment of the invention. Referring to FIG. 1, the vehicle 1 includes an engine 10, a first motor generator (hereinafter, referred to as a first MG) 20, a second motor generator (hereinafter, referred to as a second MG) 30, a power control unit (PCU) 60, an air conditioner 65, a storage battery 70, an electric power conversion device 78, drive wheels 80, a transmission 86, and an electronic control unit (ECU) 200. The transmission 86 includes a drive shaft 16, a power split device 40, a decelerator 58, and an axle 82.

The vehicle 1 travels by using a driving force that is output from at least one of the engine 10 and the second MG 30. Power that is generated by the engine 10 is divided into two paths by the power split device 40. One of the two paths is a path for power transmission from the engine 10 to the drive wheels 80 via the decelerator 58. The other path is a path for power transmission from the engine 10 to the first MG 20.

The first MG 20 and the second MG 30 are, for example, three-phase AC electric rotating machines. The first MG 20 and the second MG 30 are driven by the PCU 60.

The first MG 20 has a function as a generator. The first MG 20 generates electric power by using the power of the engine 10 that is divided by the power split device 40. The electric power that is generated by the first MG 20 is supplied to the storage battery 70 or the second MG 30 through the PCU 60. The storage battery 70 is charged in this manner. In addition, the first MG 20 rotates a crankshaft (output shaft) of the engine 10 by receiving electric power from the storage battery 70. In this manner, the first MG 20 has a function as a starter that starts the engine 10.

The second MG 30 has a function as a driving motor. The second MG 30 applies a driving force to the drive wheels 80 by using at least one of the electric power that is stored in the storage battery 70 and the electric power that is generated by the first MG 20. In addition, the second MG 30 has a function as a generator that generates electric power by regenerative braking. The electric power that is generated by the second MG 30 is supplied to the storage battery 70 through the PCU 60. The storage battery 70 is charged in this manner.

The engine 10 is, for example, an internal combustion engine such as a gasoline engine and a diesel engine. The engine 10 includes a plurality of cylinders 102, a fuel injection device 104, an ignition device 105, an intake passage 112, and an exhaust passage 113. The fuel injection device 104 injects an appropriate amount of fuel to each of the cylinders at an appropriate time based on a control signal S1 from the ECU 200. The ignition device 105 has a plurality of spark plugs corresponding respectively to the plurality of cylinders. The ignition device 105 sparks the spark plugs for the respective cylinders at an appropriate ignition timing based on a control signal from the ECU 200.

An air cleaner 112A, an air flow meter 112B, an intake air temperature sensor 112C, and an electronic throttle valve 112D are disposed in the intake passage 112 of the engine 10. The air cleaner 112A captures dust in intake air. The air flow meter 112B detects an intake amount FA of the air taken into the engine 10. The intake air temperature sensor 112C detects the temperature TA of the air taken into the engine 10. The intake air temperature sensor 112C transmits a signal that shows the detected air temperature TA to the ECU 200. The electronic throttle valve 112D includes a valve for adjusting the amount of the air taken into the engine 10, a throttle motor that operates the valve based on a control signal TH from the ECU 200, and a throttle valve position sensor. The throttle valve position sensor detects the opening of the valve and transmits a signal that shows the opening to the ECU 200.

An air-fuel ratio sensor 113A, a three-way catalytic converter 113B, a catalyst temperature sensor 113C, and a muffler 113D are disposed in the exhaust passage 113 of the engine 10. The three-way catalytic converter 113B is a catalyst that purifies exhaust gas from the engine 10. The air-fuel ratio sensor 113A detects an air-fuel ratio (A/F) Raf by using the exhaust gas that is introduced into the three-way catalytic converter 113B. The catalyst temperature sensor 113C detects the temperature Tc of the three-way catalytic converter 113B. The air-fuel ratio sensor 113A transmits a signal that shows the detected air-fuel ratio Raf to the ECU 200. The catalyst temperature sensor 113C transmits a signal that shows the temperature Tc of the three-way catalytic converter 113B to the ECU 200. An oxygen sensor may be used instead of the air-fuel ratio sensor 113A.

A water temperature sensor 106 detects the temperature Tw of a coolant that flows in the engine 10 (hereinafter, referred to as a coolant temperature Tw). The water temperature sensor 106 transmits a signal that shows the detected coolant temperature Tw to the ECU 200. A knock sensor 144 detects the knocking of the engine 10 and transmits a signal KN that shows the detection to the ECU 200.

An engine rotation speed sensor 11 detects a rotation speed Ne of the crankshaft of the engine 10 (hereinafter, referred to as an engine rotation speed). The engine rotation speed sensor 11 transmits a signal that shows the detected engine rotation speed Ne to the ECU 200.

The power split device 40 mechanically connects the three elements of the drive shaft 16 for rotating the drive wheels 80, the output shaft of the engine 10, and a rotating shaft of the first MG 20 to each other. With any one of the three elements described above being a reaction force element, the power split device 40 allows power transmission between the other two elements. A rotating shaft of the second MG 30 is connected to the drive shaft 16.

The power split device 40 is a planetary gear mechanism that includes a sun gear, a pinion gear, a carrier, and a ring gear. The pinion gear meshes with each of the sun gear and the ring gear. The carrier supports the pinion gear to be rotatable and is connected to the crankshaft of the engine 10. The sun gear is connected to the rotating shaft of the first MG 20. The ring gear is connected to the rotating shaft of the second MG 30 and the decelerator 58 with the drive shaft 16 interposed.

The decelerator 58 transmits power from the power split device 40 and the second MG 30 to the drive wheels 80. In addition, the decelerator 58 transmits a reaction force from a road surface that is received by the drive wheels 80 to the power split device 40 and the second MG 30.

The PCU 60 converts DC electric power that is stored in the storage battery 70 into AC electric power for driving the first MG 20 and the second MG 30. The PCU 60 includes a boost converter 62 and an inverter 64. The boost converter 62 and the inverter 64 are controlled based on a control signal S2 from the ECU 200.

The boost converter 62 boosts the voltage of the DC electric power that is received from the storage battery 70 or the electric power conversion device 78 and outputs the boosted DC electric power to the inverter 64. The inverter 64 converts the DC electric power that is output from the boost converter 62 into AC electric power and outputs the AC electric power to the first MG 20 and/or the second MG 30. In this manner, the first MG 20 and/or the second MG 30 are/is driven by using the electric power that is stored in the storage battery 70 or the electric power that is supplied from an outside power supply. In addition, the inverter 64 converts the AC electric power that is generated by the first MG 20 and/or the second MG 30 into DC electric power and outputs the DC electric power to the boost converter 62. The boost converter 62 lowers the voltage of the DC electric power that is output from the inverter 64 and outputs the voltage-lowered DC electric power to the storage battery 70. In this manner, the storage battery 70 is charged by using the electric power that is generated by the first MG 20 and/or the second MG 30.

The boost converter 62 is disposed between nodes N1, N1' and nodes N2, N2'. The storage battery 70 and the electric power conversion device 78 are connected to the nodes N1, N1'. The inverter 64 is connected to the nodes N2, N2'.

Figure 2:
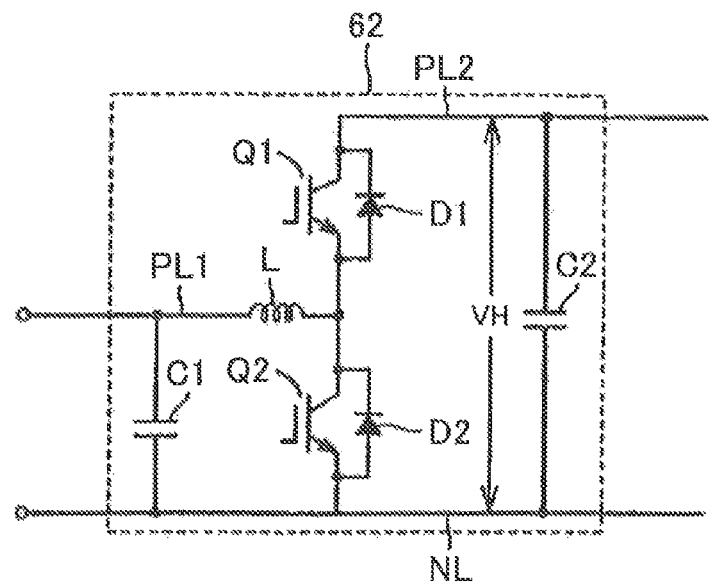
FIG. 2 is a diagram showing the configuration of a boost converter included in FIG. 1.

FIG. 2 is a diagram showing the configuration of the boost converter 62 included in FIG. 1.

The boost converter 62 includes power transistors Q1, Q2, diodes D1, D2, a reactor L, a capacitor C1, and a capacitor C2. The power transistors Q1, Q2 are connected in series between a positive line PL2 and a negative line NL. The diodes D1, D2 are connected in antiparallel to the power transistors Q1, Q2, respectively. The reactor L is connected between a connection node for the power transistors Q1, Q2 and a positive line PL1. Electric power switching elements such as an insulated gate bipolar transistor (IGBT) and a power metal oxide semiconductor field-effect transistor (MOSFET) can be used as the power transistors Q1, Q2.

The boost converter 62 receives electric power supply from the storage battery 70 or the electric power conversion device 78 and boosts the voltage of the positive line PL2 to at least the voltage of the positive line PL1 based on the signal S2 from the ECU 200. Specifically, the boost converter 62 stores a current that flows when the power transistor Q2 is ON in the reactor L as magnetic field energy and releases the stored energy to the positive line PL2 via the diode D1 when the power transistor Q2 is OFF. In this manner, the boost converter 62 can adjust the voltage of the positive line PL2 to at least the voltage of the positive line PL1.

When the on-duty of the power transistor Q2 is increased, the energy that is stored in the reactor L is increased, and thus the voltage of the positive line PL2 is boosted. When the on-duty of the power transistor Q1 is increased, the current that flows from the positive line PL2 to the positive line PL1 is increased, and thus the voltage of the positive line PL2 is reduced. Accordingly, the voltage of the positive line PL2 can be controlled to be any voltage equal to or above the voltage of the positive line PL1 by controlling the duty ratio of the power transistors Q1, Q2. The voltage of the positive line PL2 can be equal to the voltage of the positive line PL1 if the power transistor Q1 remains ON all the time (non-boost state).

The capacitor C1 is connected between the positive line PL1 and the negative line NL and smoothes the voltage fluctuation between the positive line PL1 and the negative line NL. The capacitor C2 is connected between the positive line PL2 and the negative line NL and smoothes the voltage fluctuation between the positive line PL2 and the negative line NL. In the following description, a system voltage VH will be used in some cases to refer to that at both ends of the capacitor C2.

The storage battery 70 is an electric power storage device and a rechargeable DC electric power supply. The storage battery 70 is connected to the PCU 60. A secondary battery such as a nickel-hydrogen battery and a lithium-ion battery can be used as the storage battery 70. The DC voltage of the storage battery 70 is, for example, approximately 200 V. The storage battery 70 is not limited to the secondary battery. For example, the storage battery 70 may be what can generate a DC voltage such as a capacitor, a solar cell, and a fuel cell.

Whether to supply electric power to the storage battery 70 (charging), output electric power from the storage battery 70 (discharging), or maintain a charging amount for the storage battery 70 is determined based on a state of charge (SOC) that shows the remaining capacity of the storage battery 70.

Figure 3:
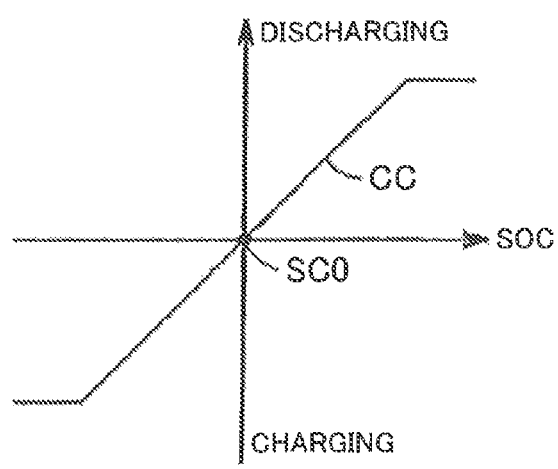
FIG. 3 is a diagram showing a charging amount for a storage battery 70 and the amount of discharging from the storage battery 70 with respect to an SOC.

FIG. 3 is a diagram showing the charging amount for the storage battery 70 and the amount of discharging from the storage battery 70 with respect to the SOC.

The charging amount and the discharging amount for the storage battery 70 corresponding to the current SOC are determined in accordance with the characteristic line CC that is illustrated in FIG. 3. In a case where the SOC exceeds a predetermined value SC0, electric power is output from the storage battery 70. In a case where the SOC is exceeded by the predetermined value SC0, electric power is supplied to the storage battery 70. When the SOC is equal to the predetermined value SC0, the current charging amount for the storage battery 70 is maintained.

The air conditioner 65 is operated by using the electric power of the storage battery 70. The air conditioner 65 is illustrated in FIG. 1 as an example of an auxiliary machine.

A temperature sensor 156 detects the temperature TB of the storage battery 70. A current sensor 158 detects the current IB of the storage battery 70. A voltage sensor 160 detects the voltage VB of the storage battery 70. The temperature sensor 156 transmits a signal that shows the temperature TB to the ECU 200. The current sensor 158 transmits a signal that shows the current IB to the ECU 200. The voltage sensor 160 transmits a signal that shows the voltage VB to the ECU 200.

An accelerator position sensor 162 detects a depression amount AP of an accelerator pedal (not illustrated). The accelerator position sensor 162 transmits a signal that shows the depression amount AP of the accelerator pedal to the ECU 200.

A first resolver 12 detects the rotation speed Nm1 of the first MG 20. The first resolver 12 transmits a signal that shows the detected rotation speed Nm1 to the ECU 200. A second resolver 13 detects the rotation speed Nm2 of the second MG 30. The second resolver 13 transmits a signal that shows the detected rotation speed Nm2 to the ECU 200.

A vehicle wheel speed sensor 14 detects the rotation speed Nw of the drive wheels 80. The vehicle wheel speed sensor 14 transmits a signal that shows the detected rotation speed Nw to the ECU 200. The ECU 200 calculates a vehicle speed based on the received rotation speed Nw. The ECU 200 may calculate the vehicle speed based on the rotation speed Nm2 of the second MG 30 instead of the rotation speed Nw.

The electric power conversion device 78 converts AC electric power that is supplied from an external electric power supply 302 into DC electric power for charging the storage battery 70. In addition, the electric power conversion device 78 supplies the DC electric power of the storage battery 70 or the electric power that is generated by the engine 10 and the first MG 20 to the power recipient outside of the vehicle. The first MG 20 generates AC electric power as the engine 10 drives the first MG 20. The PCU 60 converts this AC electric power into DC electric power. The electric power conversion device 78 converts the DC electric power from the PCU 60 into AC electric power. The electric power conversion device 78 can be realized by, for example, a single device that is capable of bidirectional DC-AC electric power conversion. Alternatively, the electric power conversion device 78 may be realized by combining an electric power supply device for DC-AC conversion with a charging device for AC-DC conversion.

An electric power cable 300 is connected between a socket 84 of the vehicle 1 and the external electric power supply 302. The electric power cable 300 has a connector 310 that is connected to the socket 84. Electric power is supplied from the external electric power supply 302 to the electric power conversion device 78 via the electric power cable 300. The DC electric power of the storage battery 70 or the electric power that is generated by the engine 10 and the first MG 20 is supplied to the outside power recipient via the electric power conversion device 78 and the electric power cable 300.

The ECU 200 generates the control signal S1 for controlling the engine 10 and outputs the generated control signal S1 to the engine 10. In addition, the ECU 200 generates the control signal S2 for controlling the PCU 60 and outputs the generated control signal S2 to the PCU 60. In addition, the ECU 200 generates a control signal S3 for controlling the electric power conversion device 78 and outputs the generated control signal S3 to the electric power conversion device 78.

The vehicle 1 is also provided with a manually-operated IG switch 90. The IG switch 90 inputs a start request and a stop request for the entire system of the vehicle 1 to the ECU 200. Positions at which the IG switch 90 is operated include an IG OFF position, an IG ON position, and a start position. The IG OFF position is a position for putting the system into a stopped state (ready-OFF state). The IG ON position is a position for putting the system into an energized state (IG-ON state). The start position is a position for putting the system into a starting state (ready-ON state). The IG switch 90 generates a signal IG for showing the respective states of the system and transmits the generated signal IG to the ECU 200.

The vehicle 1 is also provided with a manually-operated parking switch 91. The parking switch 91 is a switch for selecting a parking position among a plurality of shift positions. In a case where the parking switch 91 is operated, the parking switch 91 transmits a signal PRK to the ECU 200. The parking switch 91 may also be, for example, a push switch, a lever switch, a rotary switch, or the like. The plurality of shift positions include a neutral position, a forward traveling position, and a reverse traveling position in addition to the parking position. The shift positions other than the parking position are selected by a shift lever 92. The shift lever 92 transmits a signal that shows the selected shift position to the ECU 200. The parking position may be selectable by the shift lever 92 instead of the parking switch 91.

In a case where the signal PRK is received from the parking switch 91 and the shift position is a non-parking position, the ECU 200 switches the shift position from the non-parking position to the parking position. In this case, a parking lock device 93 fixes the drive shaft 16, controlled by the ECU 200, so that the drive shaft 16 is not moved. Accordingly, a movement of the vehicle 1 is limited.

According to the configuration that is illustrated in FIG. 1, a power transmission path is present between the engine 10 and the drive shaft 16. In addition, a power transmission path is present between the second MG 30 and the drive shaft 16 as well. The first MG 20 is arranged to generate electric power by using at least part of the power that is generated by the engine 10. In other words, the engine 10 is used for both the traveling of the vehicle 1 and the driving of the first MG 20.

The ECU 200 controls the entire hybrid system, so that the vehicle 1 can be operated with the maximum efficiency, by controlling the engine 10, the PCU 60, and the like. In other words, the ECU 200 controls the charging and discharging of the storage battery 70 and operations of the engine 10, the first MG 20, and the second MG 30.

The ECU 200 calculates a driving force demand corresponding to the depression amount AP of the accelerator pedal. The ECU 200 controls the torques of the first MG 20 and the second MG 30 and the output of the engine 10 in accordance with the calculated driving force demand.

When the efficiency of the engine 10 is low as, for example, in starting of the vehicle 1 or low-speed traveling of the vehicle 1, the vehicle 1 stops the engine 10 and travels by using only the second MG 30. During normal traveling of the vehicle 1, for example, the power of the engine 10 is divided into power for the two paths by the power split device 40. The drive wheels 80 are directly driven by one of the powers. The first MG 20 is driven by the other power and electric power is generated. In this case, the ECU 200 drives the second MG 30 by using the generated electric power. In this manner, the second MG 30 assists in the driving of the drive wheels 80.

When the vehicle 1 is decelerated, the second MG 30 that is driven by the rotation of the drive wheels 80 functions as a generator, and regenerative braking is performed thereby. The electric power that is recovered by the regenerative braking is stored in the storage battery 70. In a case where the storage battery 70 needs to be charged due to a reduction in the SOC of the storage battery 70, the ECU 200 increases the output of the engine 10 so as to increase the amount of electric power generation by the first MG 20. In this manner, the SOC of the storage battery 70 is increased.

Even during the low-speed traveling of the vehicle 1, the ECU 200 may perform control for increasing the driving force of the engine 10 if necessary. The ECU 200 may increase the driving force of the engine 10 in, for example, a case where the storage battery 70 needs to be charged, a case where the auxiliary machine such as the air conditioner 65 is driven, or a case where the temperature of the coolant of the engine 10 is raised to a predetermined temperature.

The electric power that is stored in the storage battery 70 is used in a case where the air conditioner 65 is operated while the vehicle 1 is stopped and in a case where no electric power is supplied to the vehicle 1 from the outside power supply. In a case where the storage battery 70 needs to be charged, the ECU 200 operates the engine 10. The engine 10 drives the first MG 20 and the first MG 20 generates electric power. The electric power that is generated by the first MG 20 is supplied, by the PCU 60, to the air conditioner 65 via the storage battery 70 or to the storage battery 70 and the air conditioner 65. Accordingly, not only can the operation of the air conditioner 65 be continuous but also the storage battery 70 can be charged.

Figure 4:
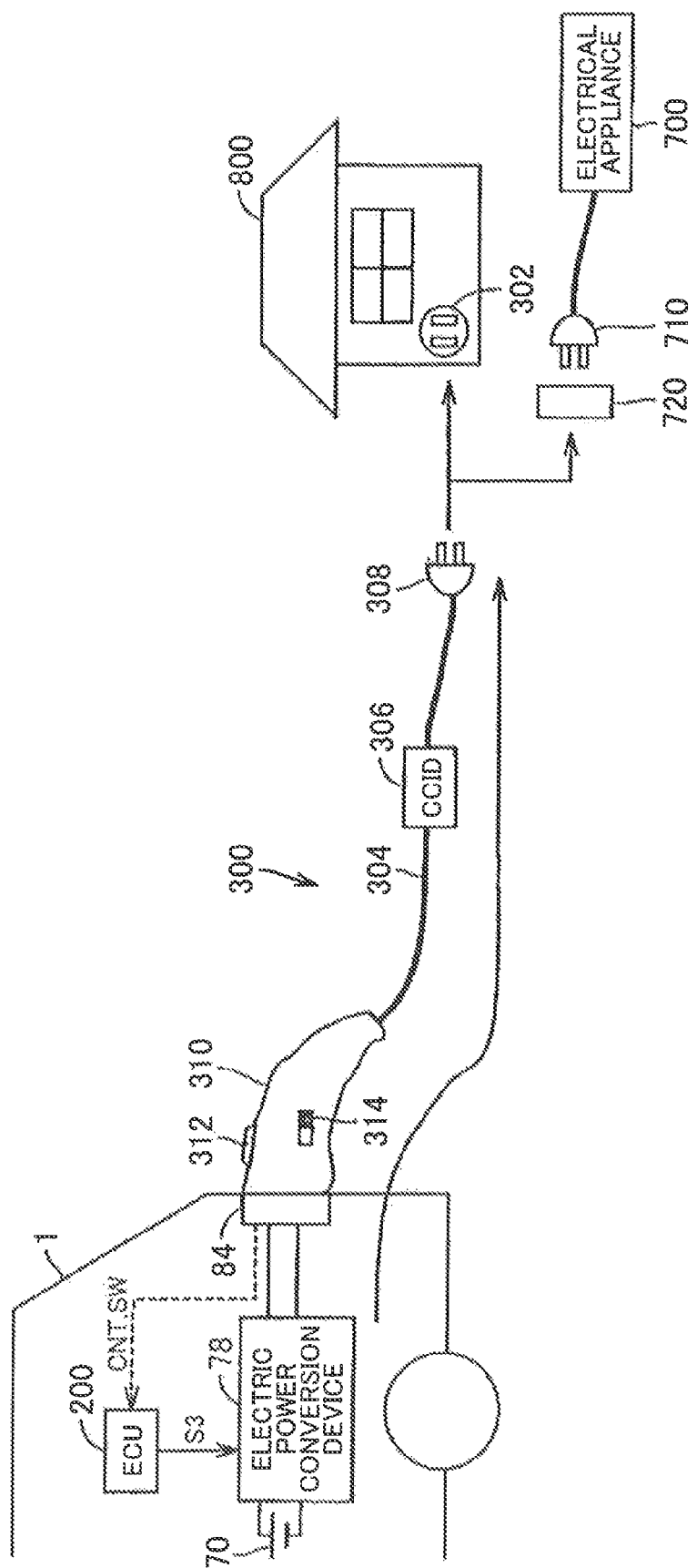
FIG. 4 is a schematic diagram illustrating a configuration example for charging and supplying electric power to the vehicle 1 according to the first embodiment of the invention.

FIG. 4 is a schematic diagram illustrating a configuration example for charging and supplying electric power to the vehicle 1 according to the first embodiment of the invention. Referring to FIG. 4, the electric power cable 300 has the connector 310, an electric power line 304, a charging circuit interrupt device (CCID) 306, and a plug 308. The connector 310 is arranged at one end of the electric power line 304. The plug 308 is arranged at the other end of the electric power line 304. The CCID 306 is disposed in the middle of the electric power line 304.

The connector 310 is connected to the socket 84 of the vehicle 1. In a case where the storage battery 70 of the vehicle 1 is charged, the plug 308 is connected to the external electric power supply 302. In FIG. 4, the external electric power supply 302 is illustrated as a socket that is disposed in a house 800.

The CCID 306 functions as a circuit for switching between the supply of electric power from the external electric power supply 302 to the vehicle 1 and interruption of the supply. The operation of the CCID 306 is in compliance with the standards defined by, for example, the Society of Automotive Engineers (SAE) of the United States of America, the Japan Electric Vehicle Association, or the like.

Switches 312, 314 are disposed in the connector 310. The switches 312, 314 are operated by a user. The switch 312 is provided, for example, with a mechanism for removing the connector 310 from the socket 84. Various types of control such as the interruption of electric power supply by the CCID 306 may be executed in association with the operation of the switch 312. In a case, for example, where the connector 310 is connected to the socket 84 as illustrated in FIG. 4, a signal CNT is sent from the connector 310 to the ECU 200 via the socket 84. The signal CNT is a signal that shows the connection between the connector 310 and the socket 84.

The switch 314 is a switch for switching between charging (of the storage battery 70) of the vehicle 1 and external electric power supply. When charging is selected by the switch 314, the electric power cable 300 transmits the electric power from the external electric power supply 302 to the vehicle 1. When external electric power supply is selected by the switch 314, the vehicle 1 performs external electric power supply. Specifically, the first MG 20 is driven by the engine 10 and electric power is generated. The electric power that is generated by the first MG 20 is supplied to the power recipient outside of the vehicle 1 via the electric power cable 300. A plug may transmit a signal SW corresponding to the operation of the switch 314 to the ECU 200 of the vehicle 1. In a case where charging is selected, for example, the signal SW has a Low level. In a case where external electric power supply is selected, the signal SW has a High level. In response to the signals CNT, SW from the electric power cable 300, the ECU 200 transmits the control signal S3 for controlling the electric power conversion device 78 to the electric power conversion device 78. The configuration of the electric power cable, the shape of the plug, and the like are not particularly limited.

During an electric power failure, for example, the plug 308 is connected to a socket in the house 800 and the vehicle 1 performs electric power supply. In this manner, electric power can be supplied from the vehicle 1 to an electrical appliance in the house 800. In addition, according to FIG. 4, the plug 308 of the electric power cable 300 and an electric power supply plug 710 of an electrical appliance 700 are electrically connected to each other via an adapter 720. In this manner, electric power can be supplied from the vehicle 1 to individual electrical appliances.

The purpose of the external electric power supply is not particularly limited. A concept is examined in which electric power can be supplied from the vehicle to electrical appliances in general outside the vehicle by using the vehicle as an electric power supply source as illustrated in FIG. 4. For example, the vehicle 1 may be used as an emergency electric power supply in the event of a disaster such as an earthquake.

The engine 10 can be operated during the external electric power supply of the vehicle 1. A movement of the vehicle 1 during the electric power supply using the power that is generated by the engine 10 needs to be prevented. Accordingly, in this embodiment, the external electric power supply is allowed in a case where the parking switch is in operation.

Figure 5:
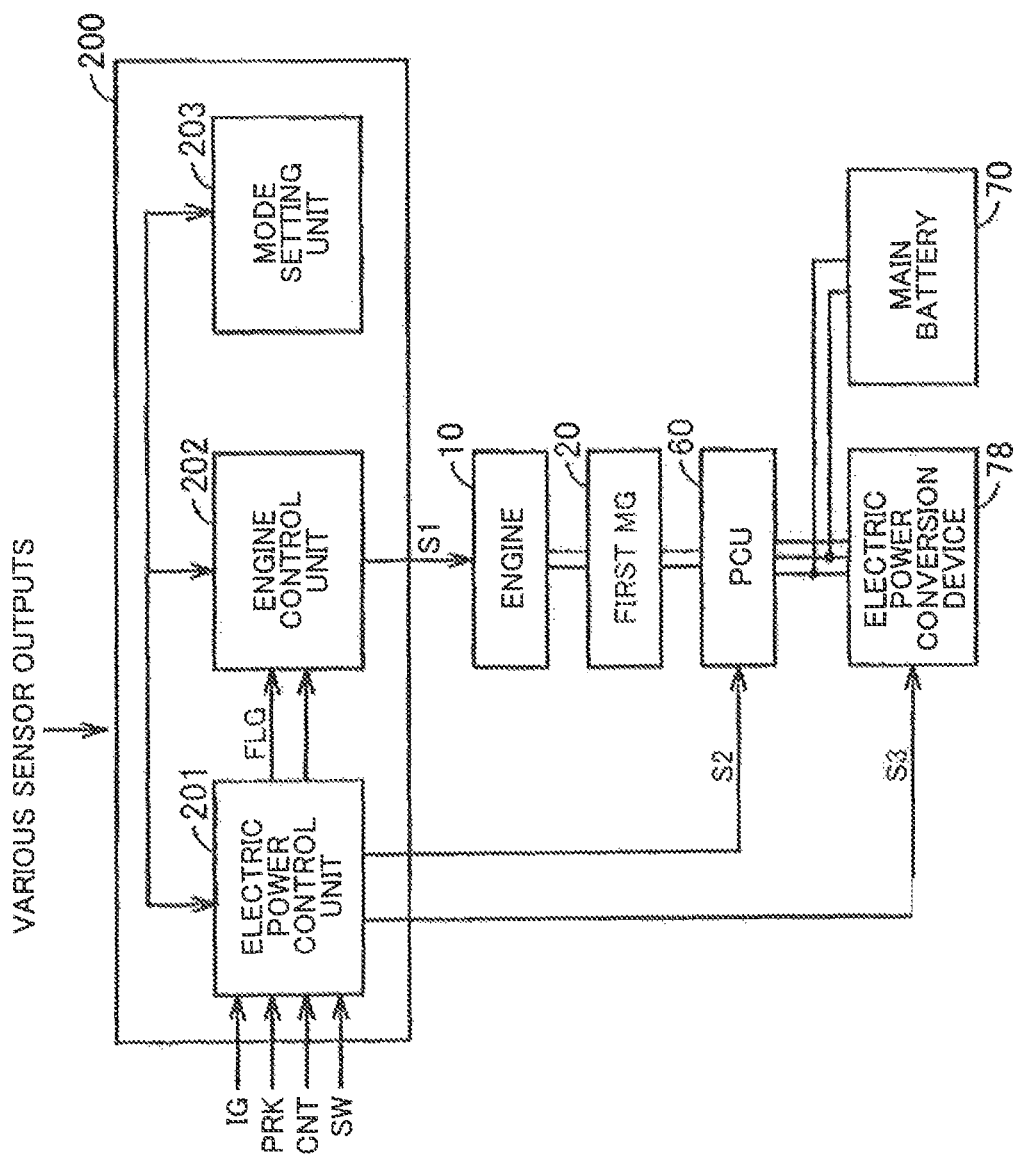
FIG. 5 is a functional block diagram of an ECU included in FIG. 1.

FIG. 5 is a functional block diagram of the ECU 200 included in FIG. 1. The functional block illustrated in FIG. 5 can be realized by using any one of hardware and software. Referring to FIG. 5, the ECU 200 includes an electric power control unit 201, an engine control unit 202, and a mode setting unit 203.

The engine control unit 202 receives outputs from various sensors relating to the engine 10 (air-fuel ratio sensor 113A, air flow meter 112B, knock sensor 144, and the like). At least the air-fuel ratio sensor 113A, the air flow meter 112B, and the knock sensor 144 among the various sensors relating to the engine 10 generate signals required for controlling the operation of the engine 10. More specifically, the air-fuel ratio sensor 113A, the air flow meter 112B, and the knock sensor 144 detect a physical quantity required for operating an actuator (not illustrated) of the engine 10 and output a signal that shows the detected physical quantity to the engine control unit 202. The engine control unit 202 generates the control signal S1 for controlling the engine 10 based on the outputs from the various sensors. The engine control unit 202 outputs the generated control signal S1 to the engine 10.

The mode setting unit 203 allows a transition of the current state to a traveling generation mode or an external supply mode. Herein, the traveling generation mode is a mode in which electric power is generated in the first MG 20 by the engine 10 during the traveling of the vehicle 1 (corresponding to a second mode). The external supply mode is a mode in which electric power is supplied to the power recipient outside of the vehicle 1 during the parking of the vehicle 1. In this embodiment, the external supply mode includes only a first external supply mode. The first external supply mode is a mode in which electric power is generated in the first MG 20 by the engine 10 during the parking of the vehicle 1 and the generated electric power is supplied to the outside power recipient (corresponding to a first mode). A case where the external supply mode includes the first external supply mode and a second external supply mode will be described in second and subsequent embodiments.

The "parking of the vehicle" according to this specification is a state where the parking position is selected as the shift position. In this state, the driving of the drive shaft 16 is prohibited by the operation of the parking switch 91. Accordingly, no driving force is generated for the vehicle. The "stopping of the vehicle" is a state where a position other than the parking position is selected as the shift position and the vehicle is stopped by a brake. The "traveling of the vehicle" is a state where a position other than the parking position is selected as the shift position. The "traveling of the vehicle" includes the "stopping of the vehicle".

The electric power control unit 201 receives outputs from various sensors for detecting the state of the storage battery 70 (voltage sensor 160 and the like). The electric power control unit 201 generates, for example, the control signal S2 for controlling the charging or discharging of the storage battery 70 based on the outputs from the sensors and transmits the generated control signal S2 to the PCU 60.

In the external supply mode and the traveling generation mode, the electric power control unit 201 generates the control signal S2 for controlling the boost converter 62 and transmits the generated control signal S2 to the PCU 60.

The electric power control unit 201 allows the system voltage VH in the first external supply mode to be lower than the system voltage VH that the first MG 20 sets when the electric power equal to the electric power in the external supply mode is supplied in the traveling generation mode.

More specifically, in the traveling generation mode, the electric power control unit 201 executes a boosting operation by the boost converter 62 regardless of the electric power that needs to be generated by the first MG 20.

In the first external supply mode, the electric power control unit 201 stops the boosting operation by the boost converter 62 in a case where the electric power that needs to be generated by the first MG 20 is equal to or less than a predetermined value A.

In the first external supply mode, the electric power control unit 201 executes the boosting operation of the boost converter 62 in a case where the electric power that needs to be generated by the first MG 20 exceeds the predetermined value A. In a case where the system voltage VH that is set by the boosting operation in the first external supply mode is exceeded by an upper limit value Vp of boosting by the boost converter 62, the electric power control unit 201 allows the system voltage VH that is set to be lower than the system voltage VH which is set by the boosting operation of the boost converter 62 when the first MG 20 supplies the electric power equal to the electric power in the first external supply mode in the traveling generation mode.

Figure 6:
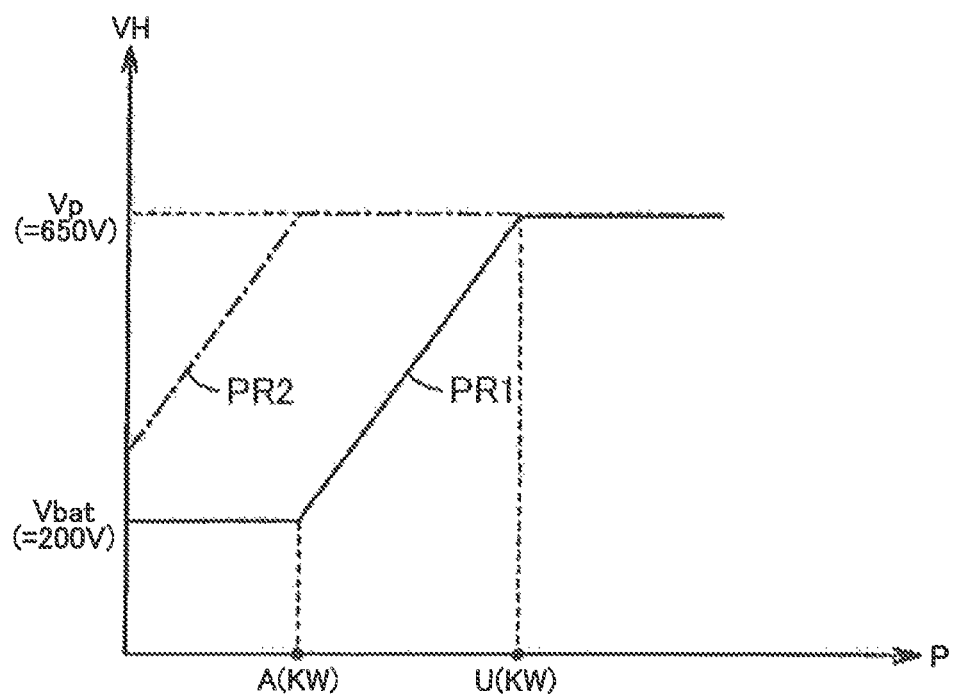
FIG. 6 is a diagram for showing boost control according to the first embodiment of the invention.

FIG. 6 is a diagram for showing boost control according to the first embodiment of the invention.

The horizontal axis in FIG. 6 represents the electric power P that is generated by the first MG 20. The vertical axis in FIG. 6 represents the system voltage VH.

The electric power P-VH characteristic PR1 represents the system voltage VH that is required for the first MG 20 to generate the electric power P. According to the characteristic PR1, the system voltage VH that is required for generating the electric power P is the voltage Vbat of the storage battery 70 (for example, 200 V) and boosting by the boost converter 62 is not necessary when the electric power P equal to or less than A (Kw). If the electric power P exceeds A (KW), the system voltage VH that is required for generating the electric power P exceeds the voltage Vbat of the storage battery 70, and thus boosting by the boost converter 62 is necessary. In the first external supply mode, no torque response needs to be ensured, and thus the system voltage VH with respect to the electric power P is set in accordance with the characteristic PR1.

In the traveling generation mode, torque response needs to be ensured, and thus the system voltage VH needs to be set to a voltage exceeding the voltage determined by the characteristic PR1.

The electric power P-VH characteristic PR2 represents the system voltage VH that is required for the first MG 20 to generate the electric power P in a state where the vehicle is stopped by the brake due to a red light or the like and the first MG 20 is generating electric power in the traveling generation mode. In this state, the system voltage VH with respect to the electric power P is set in accordance with the characteristic PR2.

This state is a state where the electric power that is generated by the first MG 20 is not sent to the second MG 30 and not used for the traveling of the vehicle and the amount of electric power generation in the second MG 30 is zero or close to zero. Accordingly, all or most of the system voltage VH is determined by the electric power generation state of the first MG 20. When the vehicle is actually moving forward or backward in the traveling generation mode, not only is the first MG 20 operated but also the second MG 30 is operated by using the electric power generated by the first MG 20 or the electric power from the storage battery 70. Accordingly, the system voltage VH needs to be set to a voltage equal to or greater than the voltage determined by the characteristic PR2.

Accordingly, in the traveling generation mode, the system voltage VH is set to the voltage determined by the characteristic PR2 (during stopping) or a voltage equal to or greater than the voltage determined by the characteristic PR2 (during forward movement or backward movement).

In a case where the electric power demand P exceeds A, the system voltage VH represented by the characteristic PR1 is less than the system voltage VH represented by the characteristic PR2 with respect to the same electric power demand P within a range exceeded by the upper limit value Vp of boosting by the boost converter 62 (for example, 650 V).

Figure 7:
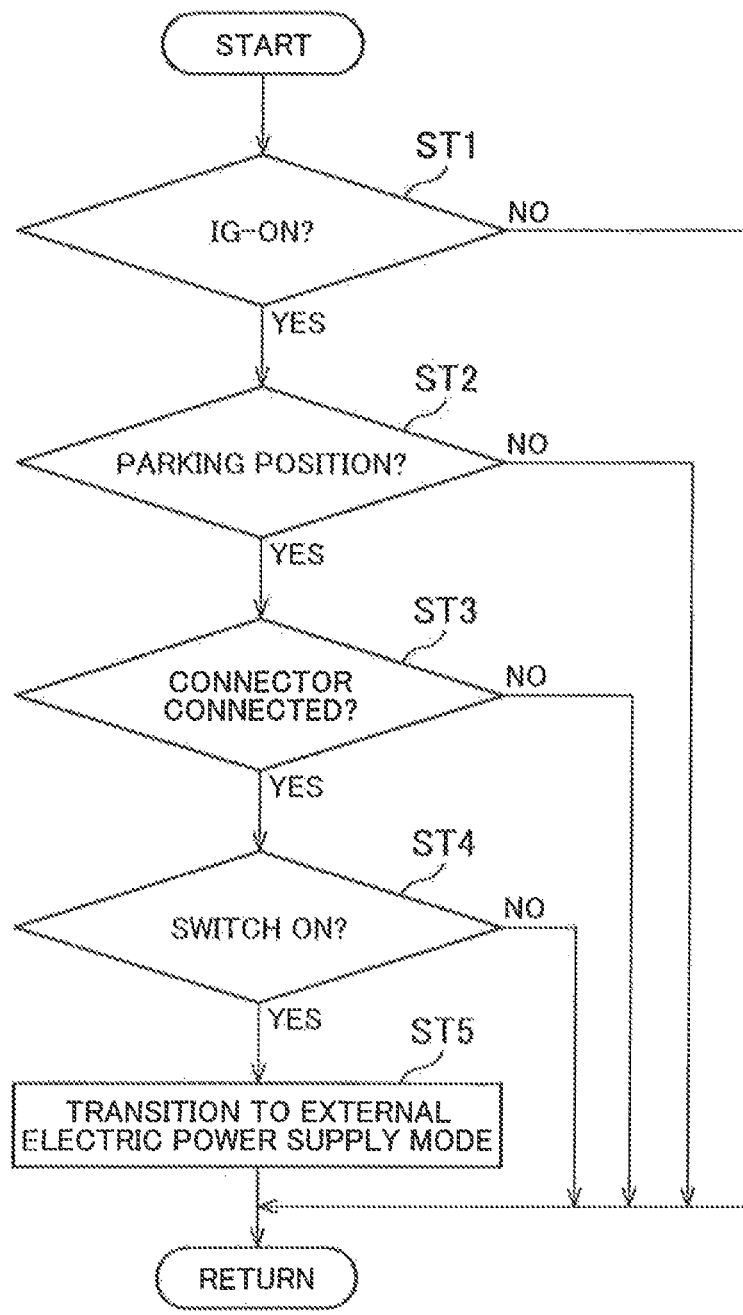
FIG. 7 is a flowchart illustrating processing for a transition of the vehicle according to the first embodiment of the invention to an external supply mode.

FIG. 7 is a flowchart illustrating processing for a transition of the vehicle according to the first embodiment to the external supply mode. The processing that is illustrated in this flowchart is, for example, called from a main routine for each predetermined period and is executed by the ECU 200 (for example, mode setting unit 203). In this embodiment, the external supply mode includes only the first external supply mode, and thus the transition to the external supply mode means a transition to the first external supply mode as well.

Referring to FIGS. 1, 4, and 7, the ECU 200 determines in Step ST1, based on the signal IG, whether or not the entire system of the vehicle 1 is in the IG-ON state. In a case where it is determined that the system is in the IG-ON state (YES in Step ST1), the processing proceeds to Step ST2. In a case where it is determined that the system is in a state other than the IG-ON state (NO in Step ST1), the entire processing returns to the main routine.

In Step ST2, the ECU 200 determines, based on the signal PRK, whether or not the parking position is selected. Since the engine 10 is operated during the external electric power supply, a movement of the vehicle 1 needs to be regulated. In a case where it is determined that the parking position is selected (YES in Step ST2), the processing proceeds to Step ST3. In a case where it is determined that the parking position is not selected (NO in Step ST2), the entire processing returns to the main routine.

In Step ST3, the ECU 200 determines, based on the signal CNT, whether or not the connector 310 of the electric power cable 300 is connected to the socket 84 of the vehicle 1. In a case where it is determined that the connector 310 is connected to the socket 84 (YES in Step ST3), the processing proceeds to Step ST4. In a case where it is determined that the connector 310 is not connected to the socket 84 (NO in Step ST3), the entire processing returns to the main routine.

In Step ST4, the ECU 200 determines, based on the signal SW, whether or not the switch 314 of the connector 310 is ON. The "switch 314 being ON" means that external electric power supply is selected by the switch 314. In a case where it is determined that the switch 314 is ON (YES in Step ST4), the processing proceeds to Step ST5. In a case where it is determined that the switch 314 is OFF (NO in Step ST4), the entire processing returns to the main routine. The "switch 314 being OFF" means that the charging of the vehicle 1 is selected by the switch 314.

In Step ST5, the ECU 200 allows the transition of the vehicle 1 to the external supply mode. When the processing of Step ST5 is terminated, the entire processing returns to the main routine. The processing from Step ST1 to Step ST5 is processing for detecting whether or not the state of the vehicle 1 is a state allowing electric power generation. The state allowing electric power generation means a state where the state of the vehicle 1 is a parking state and the first MG 20 can generate electric power by the driving of the engine 10. In the case of external electric power supply, the system of the vehicle 1 is in an energized state and the vehicle 1 is in a parking state. The state allowing electric power generation is detected in a case where the connector 310 of the electric power cable 300 is connected to the socket of the vehicle 1 and external electric power supply is selected. In this case, the transition of the vehicle 1 to the external supply mode is performed.

Figure 8:
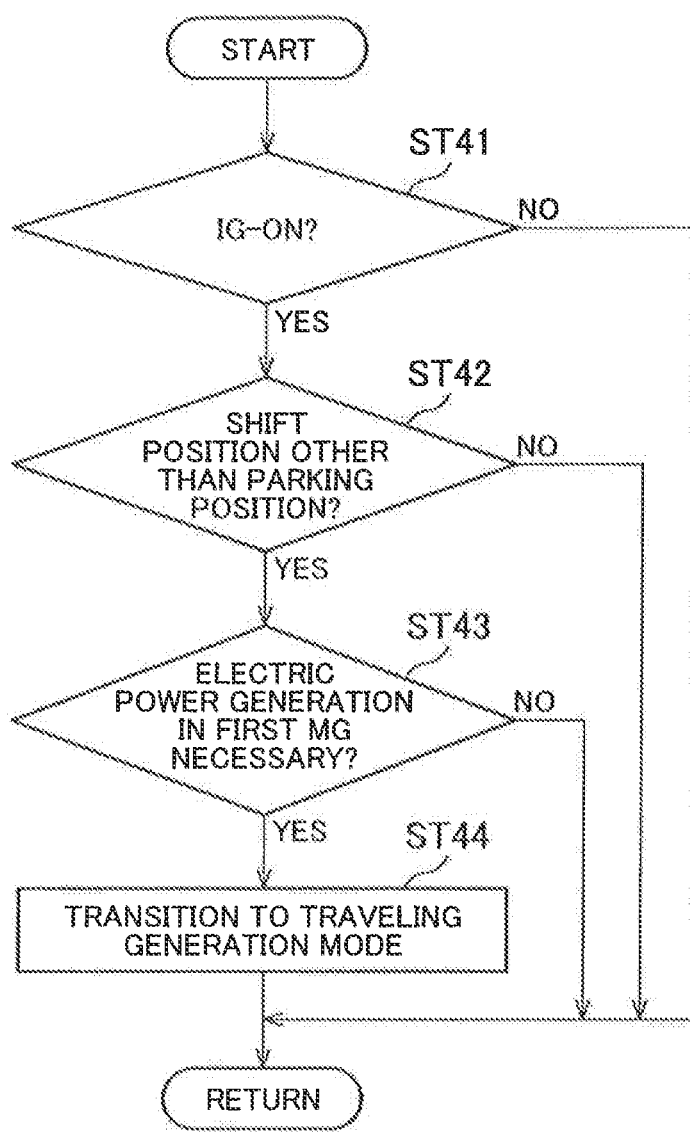
FIG. 8 is a flowchart illustrating processing for a transition of the vehicle according to the first embodiment of the invention to a traveling generation mode.

FIG. 8 is a flowchart illustrating processing for a transition of the vehicle according to the first embodiment of the invention to the traveling generation mode. The processing that is illustrated in this flowchart is, for example, called from a main routine for each predetermined period and is executed by the ECU 200 (for example, mode setting unit 203).

Referring to FIGS. 1 and 8, the ECU 200 determines in Step ST41, based on the signal IG, whether or not the entire system of the vehicle 1 is in the IG-ON state. In a case where it is determined that the system is in the IG-ON state (YES in Step ST41), the processing proceeds to Step ST42. In a case where it is determined that the system is in a state other than the IG-ON state (NO in Step ST41), the entire processing returns to the main routine.

In Step ST42, the ECU 200 determines, based on the signal PRK, whether or not a shift position other than the parking position is selected. In a case where it is determined that a position other than the parking position is selected (YES in Step ST42), the processing proceeds to Step ST43. In a case where it is determined that the parking position is selected (NO in Step ST42), the entire processing returns to the main routine.

In Step ST43, the ECU 200 determines whether or not electric power generation in the first MG 20 is necessary. Examples of a case where electric power generation in the first MG 20 is necessary include a case where the storage battery 70 needs to be charged, a case where electric power is supplied to the second MG 30 so that the second MG 30 assists in the driving of the drive wheels 80, and a case where electric power is supplied to the air conditioner 65.

In a case where it is determined that electric power generation in the first MG 20 is necessary (YES in Step ST43), the processing proceeds to Step ST44. In a case where it is determined that electric power generation in the first MG 20 is unnecessary (NO in Step ST43), the entire processing returns to the main routine.

In Step ST44, the ECU 200 allows the transition of the vehicle to the traveling generation mode. In other words, the transition of the vehicle 1 is performed to a mode in which the first MG 20 generates electric power by using the power of the engine 10 divided by the power split device 40.

Figure 9:
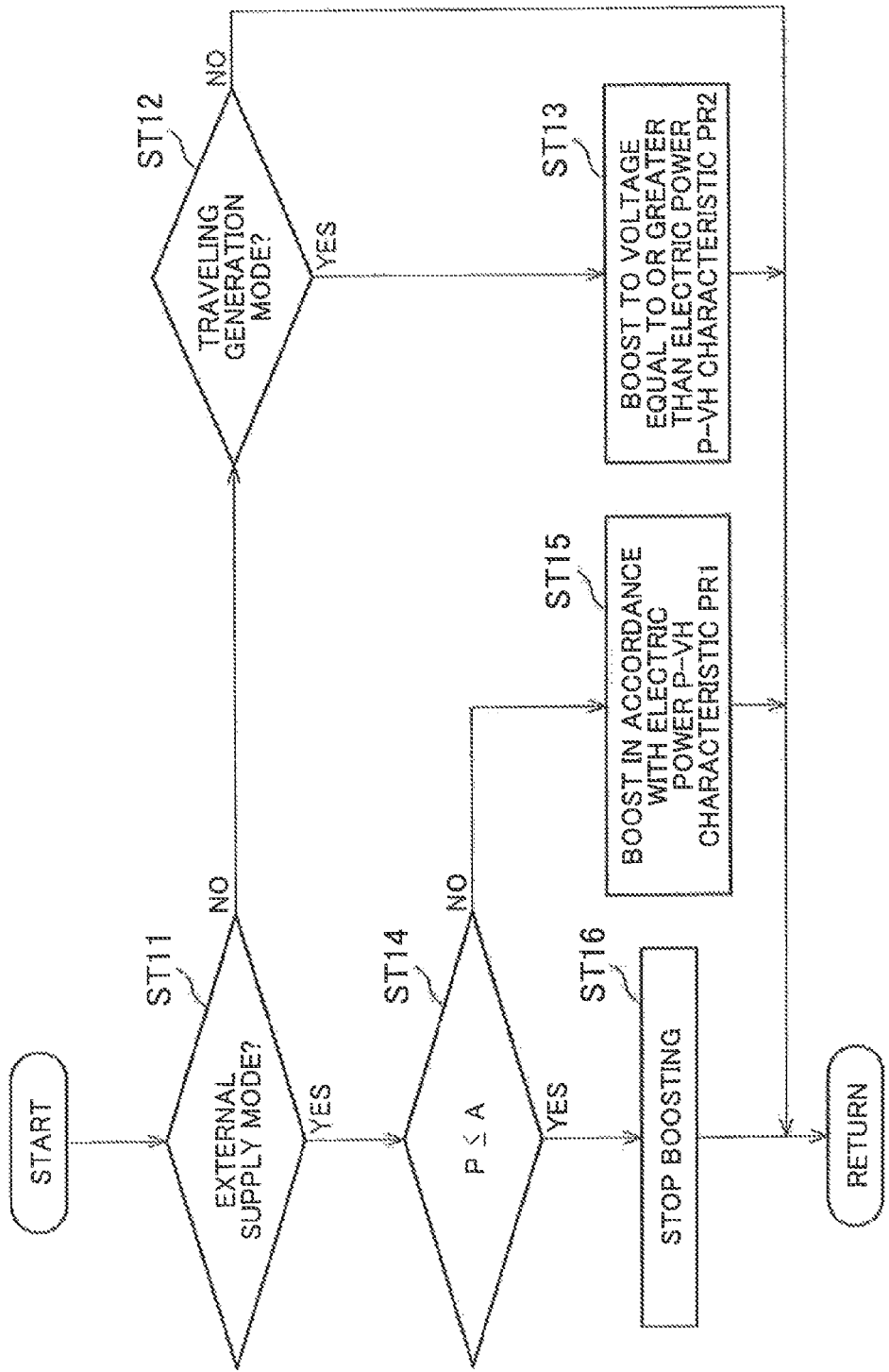
FIG. 9 is a flowchart for showing the boost control of the boost converter according to the first embodiment of the invention.

FIG. 9 is a flowchart for showing the boost control of the boost converter 62 according to the first embodiment of the invention. The processing that is illustrated in this flowchart is, for example, called from a main routine for each predetermined period and is executed by the ECU 200.

Referring to FIGS. 1 and 9, the ECU 200 determines in Step ST11 whether or not the current state of the vehicle 1 is the external supply mode. For example, the ECU 200 stores information showing the execution of the processing that is illustrated in FIG. 7. It is determined, based on this information, whether or not the current state of the vehicle 1 is the external supply mode. Alternatively, the ECU 200 may detect that the vehicle 1 is actually performing external electric power supply.

In a case where it is determined that the current state is the external supply mode (YES in Step ST11), the processing proceeds to Step ST14. In a case where it is determined that the current state of the vehicle 1 differs from the external supply mode (NO in Step ST11), the ECU 200 determines in Step ST12 whether or not the current state of the vehicle 1 is the traveling generation mode. For example, the ECU 200 stores information showing the execution of the processing that is illustrated in FIG. 8. It is determined, based on this information, whether or not the current state of the vehicle 1 is the traveling generation mode.

In a case where it is determined that the current state is the traveling generation mode (YES in Step ST12), the processing proceeds to Step ST13. In a case where it is determined that the current state of the vehicle 1 differs from the traveling generation mode (NO in Step ST12), the entire processing returns to the main routine.

In Step ST13, the ECU 200 generates the signal S2 for the system voltage VH to be a voltage equal to or greater than the voltage represented by the electric power-VH characteristic PR2 that is illustrated in FIG. 6 and sends the generated signal S2 to the boost converter 62. In other words, in the traveling generation mode, the boost converter 62 executes the boosting operation regardless of the electric power that needs to be generated by the first MG 20.

In Step ST14, the ECU 200 determines whether or not the electric power P that needs to be generated by the first MG 20 requested from the outside power recipient is equal to or less than the electric power A that can be generated without boosting the first MG 20.

In a case where it is determined that the electric power P is equal to or less than the electric power A (YES in Step ST14), the processing proceeds to Step ST16.

In Step ST16, the ECU 200 generates the signal S2 for stopping the boosting operation in the boost converter 62 and sends the generated signal S2 to the boost converter 62.

In a case where it is determined that the electric power P exceeds the electric power A (NO in Step ST14), the processing proceeds to Step ST15.

In Step ST15, the ECU 200 generates the signal S2 for the system voltage VH to be the voltage represented by the electric power-VH characteristic PR1 that is illustrated in FIG. 6 and sends the generated signal S2 to the boost converter 62.

According to this embodiment described above, the boosting operation by the boost converter is stopped in a case where electric power generation can be performed without boosting the first MG in view of the lack of necessity of an increase in the torque response in the external supply mode unlike in the traveling generation mode. Accordingly, electrical loss attributable to boosting can be reduced.

Second Embodiment

In the first embodiment, the external supply mode includes only the first external supply mode.

In this embodiment, however, the external supply mode includes the first external supply mode and the second external supply mode. As described in the first embodiment, the first external supply mode is a mode in which electric power is generated in the first MG 20 by the engine 10 during the parking of the vehicle 1 and the generated electric power is supplied to the outside power recipient (corresponding to the first mode). The second external supply mode is a mode in which the electric power of the storage battery 70 is supplied to the outside power recipient during the parking of the vehicle and the first MG 20 does not generate electric power. Also to be described in this embodiment is the variation of the electric power that needs to be generated by the first MG 20 depending on whether to charge the storage battery 70, discharge the storage battery 70, or maintain the charging amount for the storage battery 70 in the first external supply mode.

Figure 10A:
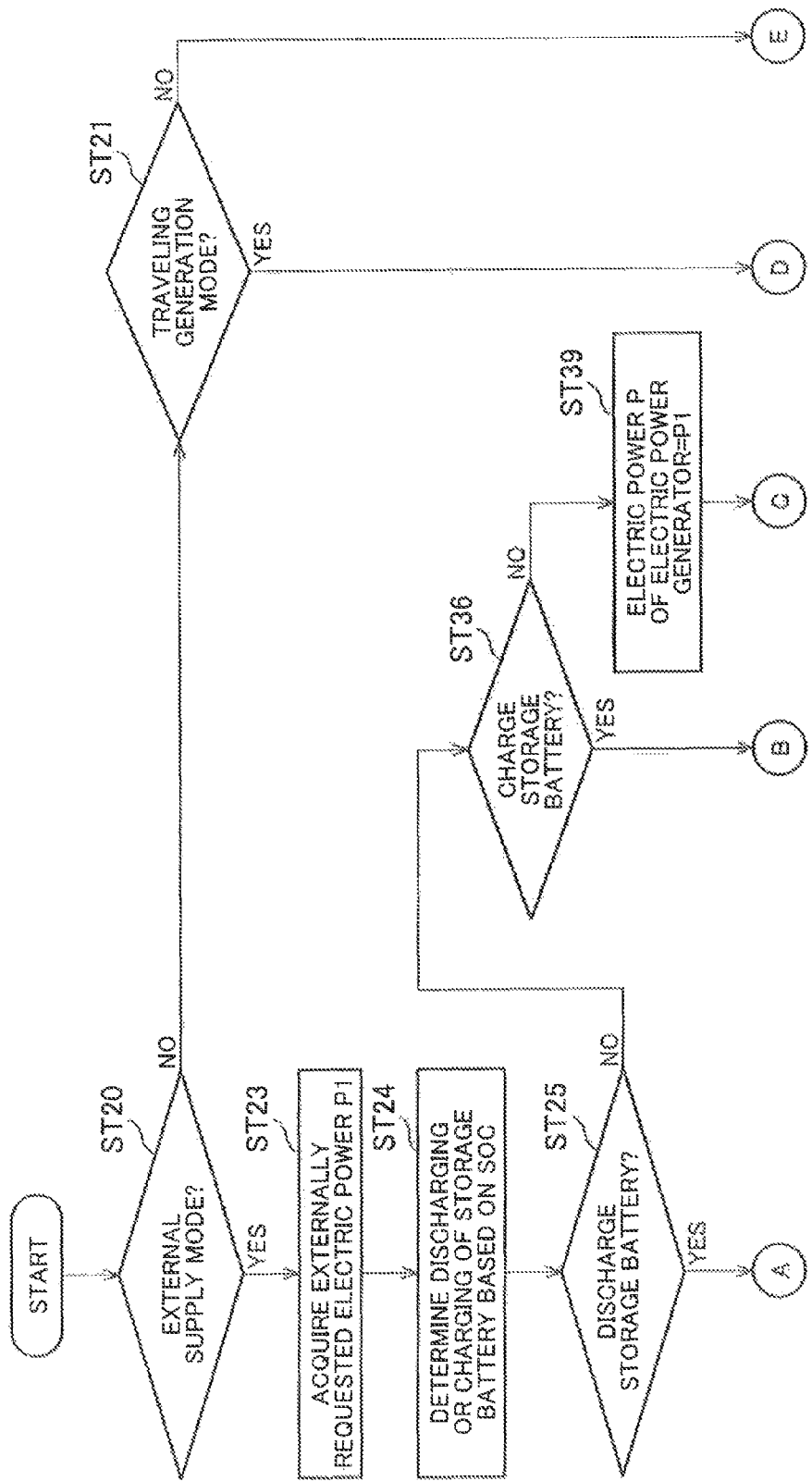
FIG. 10 is a flowchart for showing boost control of a boost converter according to a second embodiment of the invention.

FIG. 10 is a flowchart for showing boost control of the boost converter 62 according to the second embodiment of the invention. The processing that is illustrated in this flowchart is, for example, called from a main routine for each predetermined period and is executed by the ECU 200.

Referring to FIGS. 1 and 10, the processing proceeds to Step ST23 in a case where it is determined that the current state is the external supply mode (YES in Step ST20). In a case where it is determined that the current state of the vehicle 1 differs from the external supply mode (NO in Step ST20), the ECU 200 determines in Step ST21 whether or not the current state of the vehicle 1 is the traveling generation mode.

In a case where it is determined that the current state is the traveling generation mode (YES in Step ST21), the processing proceeds to Step ST22.

In a case where it is determined that the current state of the vehicle 1 differs from the traveling generation mode (NO in Step ST21), the entire processing returns to the main routine.

In Step ST22, the ECU 200 generates the signal S2 for the system voltage VH to be a voltage equal to or greater than the voltage represented by the electric power-VH characteristic PR2 that is illustrated in FIG. 6 and sends the generated signal S2 to the boost converter 62. In other words, in the traveling generation mode, the boost converter 62 executes the boosting operation regardless of the electric power that needs to be generated by the first MG 20.

In Step ST23, the ECU 200 acquires information with regard to externally requested electric power P1.

Next, in Step ST24, the ECU 200 determines whether to discharge the storage battery 70, charge the storage battery 70, or maintain the current state in view of the current SOC based on the characteristic line that is illustrated in FIG. 3. In a case where it is determined that the storage battery 70 should be discharged (YES in Step ST25), the processing proceeds to Step ST26.

In Step ST26, the ECU 200 specifies electric power supply (discharging amount) P2 from the storage battery 70 based on the characteristic line CC that is illustrated in FIG. 3.

Next, in Step ST27, the ECU 200 compares the requested electric power P1 to the discharging amount P2.

In a case where it is determined that the requested electric power P1 is equal to or less than the discharging amount P2 (YES in Step ST27), the processing proceeds to Step ST28. In a case where it is determined that the requested electric power P1 exceeds the discharging amount P2 (NO in Step ST27), the processing proceeds to Step ST31.

In Step ST28, the ECU 200 allows a transition of the vehicle 1 to the second external supply mode.

Next, in Step ST29, the ECU 200 generates the signal S2 for stopping the boosting operation in the boost converter 62 and sends the generated signal S2 to the boost converter 62.

Next, in Step ST30, the ECU 200 generates the signal S1 for stopping the engine 10 and sends the generated signal S1 to the engine.

In Step ST31, the ECU 200 subtracts the discharging amount P2 from the requested electric power P1 so that the subtracted electric power is the electric power P that should be generated by the first MG 20.

Next, in Step ST32, the ECU 200 allows a transition of the vehicle 1 to the first external supply mode.

Next, in Step ST33, the ECU 200 determines whether or not the electric power P that should be generated by the first MG 20 is equal to or less than the electric power A that the first MG 20 can generate without boosting.

In a case where it is determined that the electric power P is equal to or less than the electric power A (YES in Step ST33), the processing proceeds to Step ST34.

In Step ST34, the ECU 200 generates the signal S2 for stopping the boosting operation in the boost converter 62 and sends the generated signal S2 to the boost converter 62.

In a case where it is determined that the electric power P exceeds the electric power A (NO in Step ST33), the processing proceeds to Step ST35.

In Step ST35, the ECU 200 generates the signal S2 for the system voltage VH to be the voltage represented by the electric power-VH characteristic PR1 that is illustrated in FIG. 6 and sends the generated signal S2 to the boost converter 62.

In the case of NO in Step ST25, that is, in a case where it is determined that the storage battery 70 should be charged and it is determined that the storage battery 70 should not be discharged (YES in Step ST36), the processing proceeds to Step ST37.

In a case where it is determined that the storage battery 70 should be charged (NO in Step ST36), the processing proceeds to Step ST39.

In Step ST37, the ECU 200 specifies electric power supply (charging amount) P3 to the storage battery 70.

Next, in Step ST38, the ECU 200 adds the requested electric power P1 to the charging amount P3 so that the total electric power is the electric power P that should be generated by the first MG 20.

Next, in Step ST32, the ECU 200 allows a transition of the vehicle 1 to the first external supply mode.

Next, in Step ST33, the ECU 200 determines whether or not the electric power P that should be generated by the first MG 20 is equal to or less than the electric power A that the first MG 20 can generate without boosting.

In a case where it is determined that the electric power P is equal to or less than the electric power A (YES in Step ST33), the processing proceeds to Step ST34.

In Step ST34, the ECU 200 generates the signal S2 for stopping the boosting operation in the boost converter 62 and sends the generated signal S2 to the boost converter 62.

In a case where it is determined that the electric power P exceeds the electric power A (NO in Step ST33), the processing proceeds to Step ST35.

In Step ST35, the ECU 200 generates the signal S2 for the system voltage VH to be the voltage represented by the electric power-VH characteristic PR1 that is illustrated in FIG. 6 and sends the generated signal S2 to the boost converter 62.

In Step ST39, the ECU 200 allows the requested electric power P1 to be the electric power P that should be generated by the first MG 20.

Next, in Step ST32, the ECU 200 allows a transition of the vehicle 1 to the first external supply mode.

Next, in Step ST33, the ECU 200 determines whether or not the electric power P that should be generated by the first MG 20 is equal to or less than the electric power A that the first MG 20 can generate without boosting.

In a case where it is determined that the electric power P is equal to or less than the electric power A (YES in Step ST33), the processing proceeds to Step ST34.

In Step ST34, the ECU 200 generates the signal S2 for stopping the boosting operation in the boost converter 62 and sends the generated signal S2 to the boost converter 62.

In a case where it is determined that the electric power P exceeds the electric power A (NO in Step ST33), the processing proceeds to Step ST35.

In Step ST35, the ECU 200 generates the signal S2 for the system voltage VH to be the voltage represented by the electric power P-VH characteristic PR1 that is illustrated in FIG. 6 and sends the generated signal S2 to the boost converter 62.

According to this embodiment described above, the boosting operation by the boost converter is stopped in a case where the first MG can generate electric power without boosting as is the case with the first embodiment. Accordingly, electrical loss attributable to boosting can be reduced. In addition, according to this embodiment, the boosting operation by the boost converter is stopped in a case where electric power can be supplied to the outside power recipient only from the storage battery in the external supply mode. Accordingly, electrical loss attributable to boosting can be further reduced.

Third Embodiment

The control of the boost converter 62 in the external supply mode that has been described in the first and second embodiments can also be applied to a case where the vehicle is a series hybrid vehicle. In this embodiment, the case where the vehicle is a series hybrid vehicle will be described.

Figure 11:
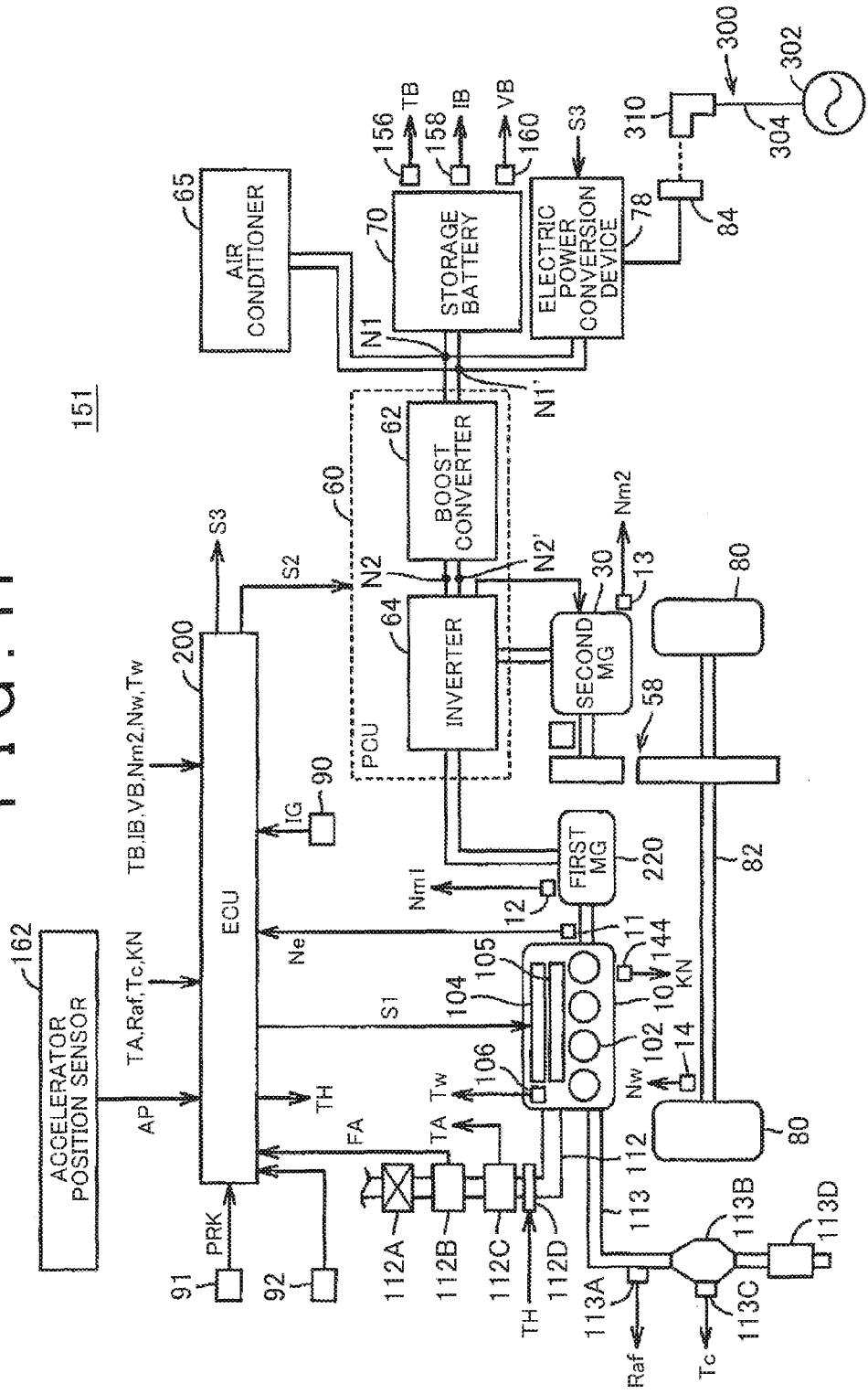
FIG. 11 is an overall block diagram of a vehicle according to a third embodiment of the invention.

FIG. 11 is an overall block diagram of a vehicle according to a third embodiment of the invention.

The vehicle 151 that is illustrated in FIG. 11 differs from the vehicle 1 illustrated in FIG. 1 in the following aspects.

The power that is generated by the engine 10 is transmitted only to a first MG 220, not being transmitted to the drive wheels 80 via the decelerator 58.

Electric power that is generated by the first MG 220 is supplied to the second MG 30 through the PCU 60.

A second MG 230 has a function as a driving motor. The second MG 230 applies a driving force to the drive wheels 80 by using at least one of the electric power that is stored in the storage battery 70 and the electric power that is generated by the first MG 220. In addition, the second MG 230 functions as a generator that generates electric power by regenerative braking. The electric power that is generated by the second MG 230 is supplied to the storage battery 70 through the PCU 60. The storage battery 70 is charged in this manner.

In the external supply mode and the traveling generation mode, the ECU 200 controls the boosting operation of the boost converter 62 as in the first embodiment or the second embodiment.

According to this embodiment described above, electrical loss attributable to boosting can be reduced as in the first embodiment or the second embodiment.

Fourth Embodiment

The control of the boost converter 62 in the external supply mode that has been described in the first and second embodiments can also be applied to a case where the vehicle is a parallel hybrid vehicle (vehicle with one MG). In this embodiment, the case where the vehicle is a parallel hybrid vehicle will be described.

Figure 12:
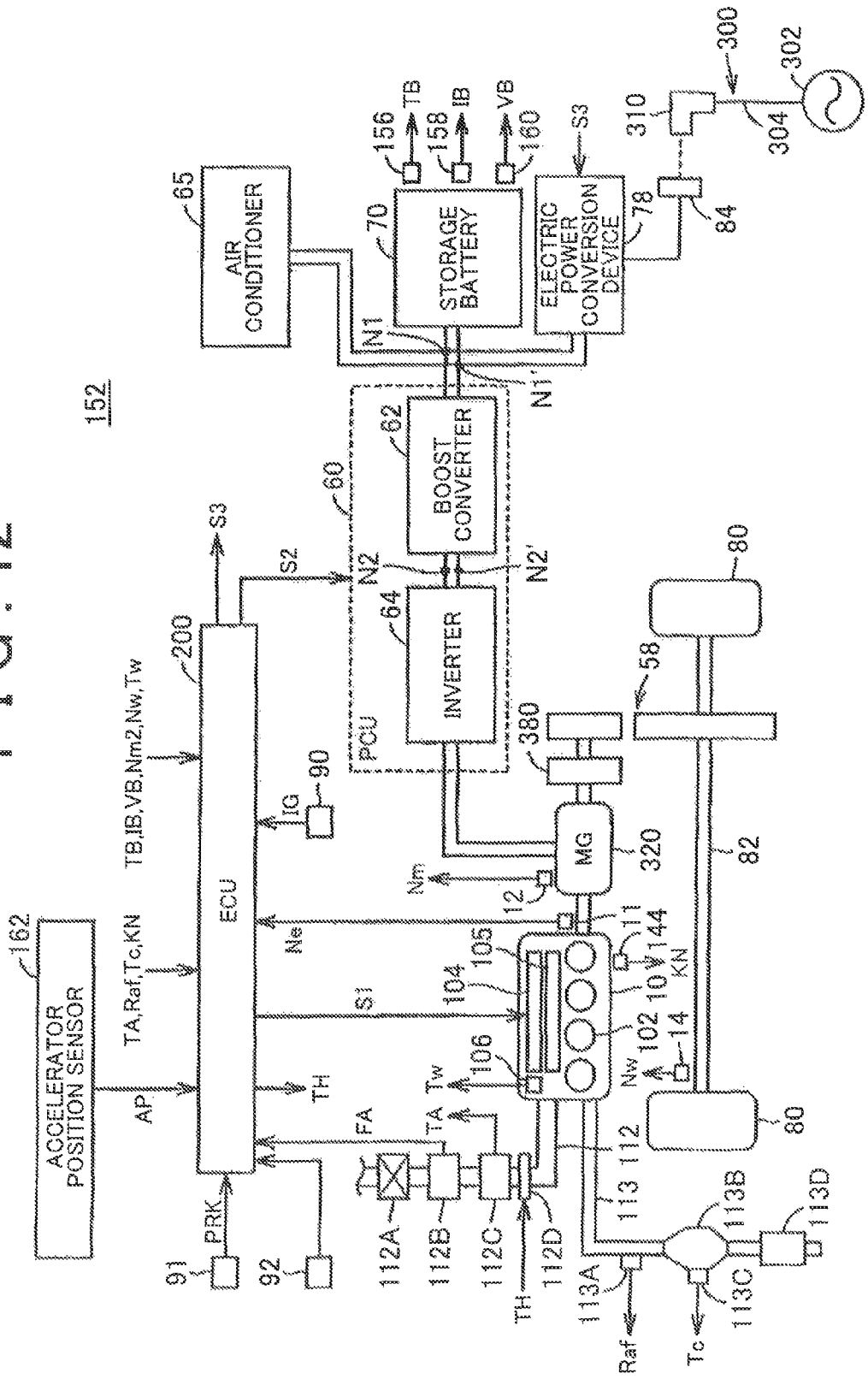
FIG. 12 is an overall block diagram of a vehicle according to a fourth embodiment of the invention.

FIG. 12 is an overall block diagram of a vehicle according to a fourth embodiment of the invention.

The vehicle 152 that is illustrated in FIG. 12 differs from the vehicle 1 illustrated in FIG. 1 in the following aspects.

The power that is generated by the engine 10 is transmitted to the drive wheels 80 via a transmission 380 and the decelerator 58. In addition, a MG 320 is driven by using the electric power from the storage battery 70. In this manner, the vehicle is driven by using the two powers of the engine 10 and the MG 320. When the efficiency of the engine 10 is high, the vehicle is driven by the engine 10 alone.

The MG 320 functions as an electric power generator. The MG 320 is driven in a regenerative mode by an inverter, and the generated regenerative electric power is sent to the storage battery 70 through the inverter and the boost converter 62.

The inverter converts DC electric power that is output from the boost converter 62 into AC electric power and outputs the AC electric power to the MG 320. In this manner, the MG 320 is driven by using the electric power that is stored in the storage battery 70. In addition, the inverter-converts AC electric power that is generated by the MG 320 into DC electric power and outputs the DC electric power to the boost converter 62.

In the external supply mode and the traveling generation mode, the ECU 200 controls the boosting operation of the boost converter 62 as in the first embodiment or the second embodiment.

According to this embodiment described above, electrical loss attributable to boosting can be reduced as in the first embodiment or the second embodiment.

Fifth Embodiment

In the embodiment described above, boosting in the boost converter 62 is stopped in a case where the electric power that should be generated by the first MG 20 is equal to or less than the electric power A that can be generated by the first MG 20 at the voltage of the storage battery 70 in the external supply mode. However, boosting in the boost converter 62 may also be stopped in a case where the electric power that should be generated by the first MG 20 is equal to or less than electric power A' which is slightly less than the electric power A.

Figure 13:
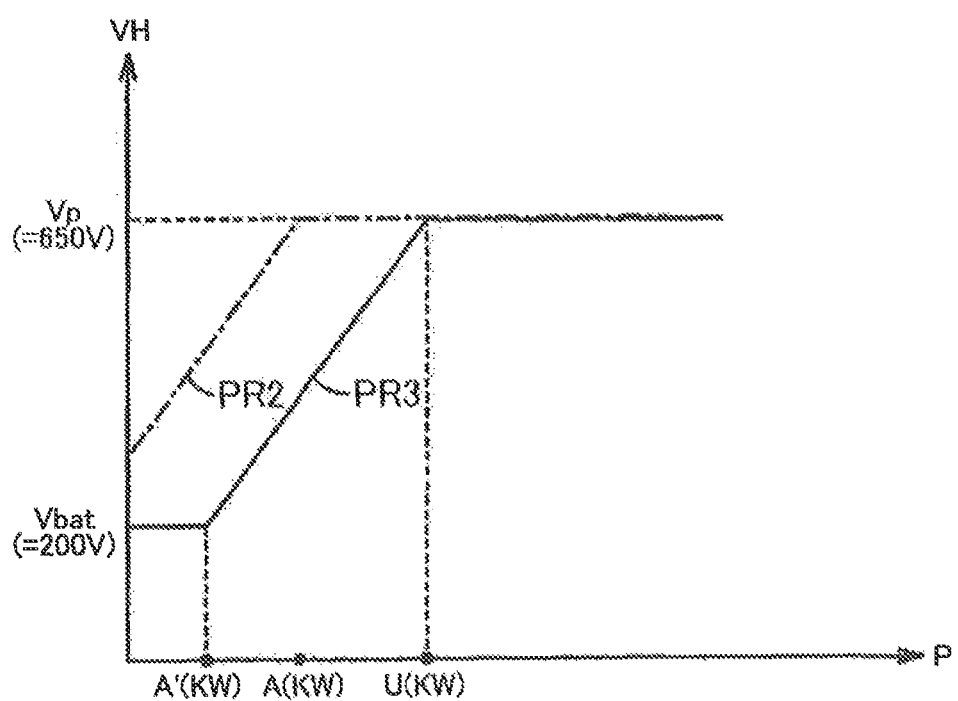
FIG. 13 is a diagram for showing boost control according to a fifth embodiment of the invention.

FIG. 13 is a diagram for showing boost control according to a fifth embodiment of the invention.

The horizontal axis in FIG. 13 represents the electric power P that is generated by the first MG 20. The vertical axis in FIG. 13 represents the system voltage VH.

The electric power P-VH characteristic PR2 is similar to that illustrated in FIG. 6.

The electric power P-VH characteristic PR3 represents the system voltage VH with respect to the electric power generation amount of the first MG 20 in the external supply mode. In the external supply mode, the system voltage VH with respect to the electric power P is set in accordance with the characteristic PR3.

In this embodiment, the boosting operation by the boost converter 62 is stopped and the voltage of the storage battery 70 is set to the system voltage VH when the electric power P is equal to or less than the electric power A' which is slightly less than A (electric power the first MG 20 can generate without boosting). In a case where the electric power P exceeds the electric power A', the voltage boosted by the boost converter 62 is set to the system voltage VH.

In the first embodiment, the boosting operation by the boost converter is stopped in a case where the electric power P is equal to or less than A (electric power that the first MG 20 can generate at the voltage of the storage battery 70) in the external supply mode. In this fifth embodiment, the boosting operation by the boost converter is stopped in a case where the electric power P is equal to or less than A' (<A) in the external supply mode. However, the invention is not limited thereto.

In a case where there is no limit regarding the range of electric power the first MG 20 can generate without the boosting operation by the boost converter 62 or in a case where externally requested electric power is within the range of the electric power generation by the first MG 20 without the boosting operation all the time in the external supply mode, the boosting operation by the boost converter 62 may be stopped across the board, regardless of the electric power that should be generated, in the external supply mode.

It should be noted that the embodiment disclosed herein is exemplary in every aspect and does not limit the invention. The scope of the invention is clarified by the claims, not the description above, and the invention includes any change within the meaning and range equivalent to the claims.

REFERENCE SIGNS LIST 1, 151, 152 Vehicle
10 Engine
11 Engine rotation speed sensor
12 First resolver
13 Second resolver
14 Vehicle wheel speed sensor
16 Drive shaft
20, 220 First MG
30 Second MG
40 Power split device
58 Decelerator
60 PCU
62 Boost converter
64 Inverter
65 Air conditioner
70 Storage battery
78 Electric power conversion device
80 Drive wheel
82 Axle
84 Socket
86, 380 Transmission
90 IG switch 91 Parking switch
92 Shift lever
102 Cylinder
104 Fuel injection device
105 Ignition device
106 Water temperature sensor
112 Intake passage
112A Air cleaner
112B Air flow meter
112C Intake air temperature sensor
112D Electronic throttle valve
113 Exhaust passage
113A Air-fuel ratio sensor
113B Three-way catalytic converter
113C Catalyst temperature sensor
113D Muffler
144 Knock sensor
156 Temperature sensor
158 Current sensor
160 Voltage sensor
162 Accelerator position sensor
200 ECU
201 Electric power control unit
202 Engine control unit
203 Mode setting unit
300 Electric power cable
308 Plug
302 External electric power supply
304 Electric power line
310 Connector
320 MG
700 Electrical appliance
710 Electric power supply plug
720 Adapter
800 House
C1, C2 Capacitor
Q1, Q2, Power transistor
D1, D2 Diode
L Reactor

The invention claimed is:

1. A vehicle comprising:
an electric power generator;
an electric power storage device;
an internal combustion engine configured to travel the vehicle and to drive the electric power generator;
an electric circuit configured to output electric power generated by the electric power generator or electric power output from the electric power storage device to a power recipient outside of the vehicle;
a drive circuit configured to drive the electric power generator;
a boost converter disposed between the electric power storage device and the electric power generator;
an inverter disposed between the boost converter and the electric power generator; and
an electronic control unit configured to set the vehicle into a first mode or a second mode, the first mode being a mode in which electric power is generated in the electric power generator by the internal combustion engine during parking of the vehicle and the generated electric power is supplied to the power recipient outside of the vehicle, the second mode being a mode in which electric power is generated in the electric power generator by the internal combustion engine during traveling of the vehicle, and the electronic control unit being configured to limit an operation of the boost converter in the first mode by reducing electric power loss attributable to boosting when the generated electric power is supplied to the power recipient outside of the vehicle.

2. The vehicle according to claim 1,
wherein the electronic control unit is configured to set a first voltage to be less than a second voltage, the first voltage is a voltage of a drive circuit side in the first mode, and the second voltage is a voltage of the drive circuit side in the second mode, when the electric power generator supplies the electric power equal to an electric power in the first mode.

3. The vehicle according to claim 2,
wherein the electronic control unit is configured to execute the boosting operation by the boost converter in the second mode regardless of electric power required to be generated by the electric power generator, and
wherein the electronic control unit is configured to stop the boosting operation by the boost converter in the first mode in a case where the electric power required to be generated by the electric power generator is equal to or less than a predetermined value.

4. The vehicle according to claim 3,
wherein the electric power required to be generated by the electric power generator is electric power obtained by subtracting a second electric power from a first electric power, in a case where the supply of the first electric power is requested from the power recipient outside of the vehicle and the second electric power is supplied from the electric power storage device to the outside power recipient in the first mode.

5. The vehicle according to claim 3,
wherein the electric power required to be generated by the electric power generator is electric power obtained by adding a first electric power to a second electric power, in a case where the supply of the first electric power is requested from the power recipient outside of the vehicle and the second electric power is supplied from the electric power generator to the electric power storage device in the first mode.

6. The vehicle according to claim 3,
wherein the electric power required to be generated by the electric power generator is a first electric power, in a case where the supply of the first electric power is requested from the power recipient outside of the vehicle, no electric power is supplied from the electric power storage device to the power recipient outside of the vehicle, and no electric power is supplied from the electric power generator to the electric power storage device in the first mode.

7. The vehicle according to claim 3,
wherein the electronic control unit is configured to execute the boosting operation by the boost converter in a case where the electric power required to be generated by the electric power generator exceeds the predetermined value in the first mode, and
wherein the electronic control unit is configured to set a third voltage to be less than a fourth voltage, in a case where a voltage set on the drive circuit side by the boosting operation in the first mode is lower than an upper limit value of boosting by the voltage conversion device,
the third voltage is a voltage set on the drive circuit side by the boosting operation in the first mode,
the fourth voltage is a voltage set on the drive circuit side by the boosting operation of the boost converter in the second mode, when the electric power generator supplies the electric power equal to the electric power in the first mode.

8. The vehicle according to claim 3, wherein the predetermined value is electric power that the electric power generator can generate without boosting.

9. The vehicle according to claim 1, wherein the electronic control unit is configured to stop a boosting operation by the boost converter in the first mode.

10. A control apparatus for a vehicle including an electric power generator, an electric power storage device, an internal combustion engine configured to travel the vehicle and to drive the electric power generator, an electric circuit configured to output electric power generated by the electric power generator or electric power output from the electric power storage device to a power recipient outside of the vehicle, a drive circuit configured to drive the electric power generator, a boost converter disposed between the electric power storage device and the electric power generator, and an inverter disposed between the boost converter and the electric power generator, the control apparatus comprising:
an electronic control unit configured to set the vehicle into a first mode or a second mode, the electronic control unit being configured to limit an operation of the boost converter in the first mode by reducing electric power loss attributable to boosting when the generated electric power is supplied to the power recipient outside of the vehicle, the first mode being a mode in which electric power is generated in the electric power generator by the internal combustion engine during parking of the vehicle and the generated electric power is supplied to the power recipient outside of the vehicle, and the second mode being a mode in which electric power is generated in the electric power generator by the internal combustion engine during traveling of the vehicle.

* * * * *